US011341127B2

(12) United States Patent
Okajima et al.

(10) Patent No.: US 11,341,127 B2
(45) Date of Patent: May 24, 2022

(54) INFORMATION PROCESSING SYSTEM, INFORMATION PROCESSING APPARATUS, INFORMATION PROCESSING METHOD, AND INFORMATION PROCESSING PROGRAM

(71) Applicant: NEC Corporation, Tokyo (JP)

(72) Inventors: Yuzuru Okajima, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 267 days.

(21) Appl. No.: 16/487,912

(22) PCT Filed: Mar. 31, 2017

(86) PCT No.: PCT/JP2017/013635
§ 371 (c)(1),
(2) Date: Aug. 22, 2019

(87) PCT Pub. No.: WO2018/179355
PCT Pub. Date: Oct. 4, 2018

(65) Prior Publication Data
US 2020/0057762 A1  Feb. 20, 2020

(51) Int. Cl.
*G06F 7/00* (2006.01)
*G06F 16/242* (2019.01)
(Continued)

(52) U.S. Cl.
CPC ........ *G06F 16/243* (2019.01); *G06F 16/2453* (2019.01); *G06F 16/24522* (2019.01); *G06N 20/00* (2019.01)

(58) Field of Classification Search
CPC ............. G06F 16/243; G06F 16/24522; G06F 16/2453; G06F 16/2455; G06F 16/3329;
(Continued)

(56) References Cited

U.S. PATENT DOCUMENTS

2016/0147737 A1* 5/2016 Ryu ...................... G06F 40/211
704/9
2017/0243116 A1* 8/2017 Takagi ................ G06F 16/2455

FOREIGN PATENT DOCUMENTS

JP    2016-95698 A    5/2016
JP    2016-133920 A   7/2016

OTHER PUBLICATIONS

Liang et al.,"Learning Dependency-Based Compositional Semantics", Proceedings of the Human Language Technology Conference of the Association for Computational Linguistics, pp. 590-599, Portland, Oregon, 2011, 10 pages total.
(Continued)

*Primary Examiner* — Mohammad A Sana
(74) *Attorney, Agent, or Firm* — Sughrue Mion, PLLC

(57) ABSTRACT

This invention provides an information processing apparatus for learning parameters to convert a question in a natural language into a query expression in a formal language, including an acceptor accepting an input of a set of a question in the natural language and a correct answer to the question, a condition generator generating condition(s) to be satisfied by the formal language input on searching a database for the correct answer, a query expression generator generating a query expression in the formal language corresponding to the question using parameters of the converter to satisfy any of the at least one condition, an answer acquirer acquiring an answer to the question based on a search of the database using the generated query expression, and a updater updating the parameters such that the question is converted with priority into the generated query expression when the answer and the correct answer match.

18 Claims, 18 Drawing Sheets

(51) Int. Cl.
  *G06N 20/00*    (2019.01)
  *G06F 16/2452*  (2019.01)
  *G06F 16/2453*  (2019.01)
(58) Field of Classification Search
  CPC .... G06F 16/3338; G06F 40/268; G06F 40/30;
           G06F 40/289; G06F 40/211; G06F
           40/284; G06N 20/00; G06N 5/02
  See application file for complete search history.

(56) References Cited

OTHER PUBLICATIONS

Pasupat et al., "Inferring Logical Forms From Denotations", Association for Computational Linguistics (ACL), 2016, 10 pages total.
Yuk Wah Wong et al., "Learning for Semantic Parsing with Statistical Machine Translation", Proceedings of the Human Language Technology Conference of the North American Chapter of the Association for Computational Linguistics (HLT/NAACL-2006), pp. 439-446, New York City, NY, Jun. 2006, 8 pages total.
Philipp Koehn et al., "Moses: Open Source Toolkit for Statistical Machine Translation", Proceedings of the ACL 2007 Demo and Poster Sessions, pp. 177-180, Prague, Jun. 2007, 4 pages total.
International Search Report dated Jun. 20, 2017 issued by the International Searching Authority in International Application No. PCT/JP2017/013635.
Written Opinion dated Jun. 20, 2017 issued by the International Searching Authority in International Application No. PCT/JP2017/013635.

* cited by examiner

| 250 | 551 ↘ | PHRASE IN NATURAL LANGUAGE | WORD IN FORMAL LANGUAGE | WEIGHT |
|---|---|---|---|---|
| | | | | |
| | | | | |
| | | ⋮ | | |
| | 552 ↘ | PHRASE IN NATURAL LANGUAGE | WORD IN FORMAL LANGUAGE | WEIGHT |
| | | "How high is" | 'Athens' | 0.0 |
| | | | 'Denali' | 0.0 |
| | | | 'Greece' | 0.0 |
| | | | 'Japan' | 0.0 |
| | | | 'Mount Fuji' | 0.0 |
| | | | 'Mount Olympus' | 0.0 |
| | | | 'USA' | 0.0 |
| | | | 'Washington D.C.' | 0.0 |
| | | | capital | 0.0 |
| | | | elevation | 0.0 |
| | | | highest_mountain | 0.0 |
| | | | population | 0.0 |
| | | "the tallest peak in" | 'Athens' | 0.0 |
| | | | 'Denali' | 0.0 |
| | | | 'Greece' | 0.0 |
| | | | 'Japan' | 0.0 |
| | | | 'Mount Fuji' | 0.0 |
| | | | 'Mount Olympus' | 0.0 |
| | | | 'USA' | 0.0 |
| | | | 'Washington D.C.' | 0.0 |
| | | | capital | 0.0 |
| | | | elevation | 0.0 |
| | | | highest_mountain | 0.0 |
| | | | population | 0.0 |
| | | "the U.S." | 'Athens' | 0.0 |
| | | | 'Denali' | 0.0 |
| | | | 'Greece' | 0.0 |
| | | | 'Japan' | 0.0 |
| | | | 'Mount Fuji' | 0.0 |
| | | | 'Mount Olympus' | 0.0 |
| | | | 'USA' | 0.0 |
| | | | 'Washington D.C.' | 0.0 |
| | | | capital | 0.0 |
| | | | elevation | 0.0 |
| | | | highest_mountain | 0.0 |
| | | | population | 0.0 |
| | | ⋮ | 'Athens' | 0.0 |
| | | | ⋮ | 0.0 |

FIG. 5

| PHRASE IN NATURAL LANGUAGE | WORD (fi) | WEIGHT (wi) | PRIORITY (pi) | exp(wi+pi) | PROBABILITY |
|---|---|---|---|---|---|
| | 'Athens' | 0.0 | 0.0 | 1.0 | 0.067 |
| | 'Denali' | 0.0 | 0.5 | 1.649 | 0.110 |
| | 'Greece' | 0.0 | 0.0 | 1.0 | 0.067 |
| | 'Japan' | 0.0 | 0.0 | 1.0 | 0.067 |
| | 'Mount Fuji' | 0.0 | 0.0 | 1.0 | 0.067 |
| | 'Mount Olympus' | 0.0 | 0.0 | 1.0 | 0.067 |
| | 'USA' | 0.0 | 0.0 | 1.0 | 0.067 |
| | 'Washington D.C.' | 0.0 | 0.0 | 1.0 | 0.067 |
| | capital | 0.0 | 0.0 | 1.0 | 0.067 |
| "How high is" | elevation | 0.0 | 1.0 | 2.718 | 0.181 |
| | highest_mountain | 0.0 | 0.5 | 1.649 | 0.110 |
| | population | 0.0 | 0.0 | 1.0 | 0.067 |
| "the tallest peak in" | 'Athens' | 0.0 | 0.0 | 1.0 | 0.067 |
| | ... | | | | |
| "the U.S." | 'Athens' | | | | |
| | ... | | | | |

1300 elevation(elevation(elevation))

⋮

1301 elevation(highest_mountain('USA'))

⋮

'USA' ( 'USA' ( 'USA' ))

F I G. 13

| PHRASE IN NATURAL LANGUAGE | WORD IN FORMAL LANGUAGE | WEIGHT |
|---|---|---|
| "How high is" | 'Athens' | 0.0 |
| | 'Denali' | 0.0 |
| | 'Greece' | 0.0 |
| | 'Japan' | 0.0 |
| | 'Mount Fuji' | 0.0 |
| | 'Mount Olympus' | 0.0 |
| | 'USA' | 0.0 |
| | 'Washington D.C.' | 0.0 |
| | capital | 0.0 |
| | elevation | 1.0 |
| | highest_mountain | 0.0 |
| | population | 0.0 |
| "the tallest peak in" | 'Athens' | 0.0 |
| | 'Denali' | 0.0 |
| | 'Greece' | 0.0 |
| | 'Japan' | 0.0 |
| | 'Mount Fuji' | 0.0 |
| | 'Mount Olympus' | 0.0 |
| | 'USA' | 0.0 |
| | 'Washington D.C.' | 0.0 |
| | capital | 0.0 |
| | elevation | 0.0 |
| | highest_mountain | 1.0 |
| | population | 0.0 |
| "the U.S." | 'Athens' | 0.0 |
| | 'Denali' | 0.0 |
| | 'Greece' | 0.0 |
| | 'Japan' | 0.0 |
| | 'Mount Fuji' | 0.0 |
| | 'Mount Olympus' | 0.0 |
| | 'USA' | 1.0 |
| | 'Washington D.C.' | 0.0 |
| | capital | 0.0 |
| | elevation | 0.0 |
| | highest_mountain | 0.0 |
| | population | 0.0 |
| ⋮ | 'Athens' | 0.0 |
| | ⋮ | |

F I G. 14

INFORMATION PROCESSING SYSTEM, INFORMATION PROCESSING APPARATUS, INFORMATION PROCESSING METHOD, AND INFORMATION PROCESSING PROGRAM

This application is a National Stage Entry of PCT/JP2017/013635 filed on Mar. 31, 2017, the contents of all of which are incorporated herein by reference, in their entirety.

TECHNICAL FIELD

The present invention relates to an information processing system, an information processing apparatus, an information processing method, and an information processing program.

BACKGROUND ART

In recent years, a large-scale knowledge base can be acquired via the Internet, and research on a system configured to make a question/answer using the knowledge base has proceeded. The knowledge base used in such a system is generally structured to extract knowledge corresponding to a query described in a formal language. As the formal language, for example, Prolog, RDF (Resource Description Framework), or the like is used.

Even in a case in which a question/answer system using a knowledge base capable of making a query using a formal language as described above, a user's question is generally expressed in a natural language. For this reason, to extract knowledge corresponding to the user's question from the knowledge base, the user's question expressed in the natural language needs to be converted into an expression in the formal language.

Conventionally, a converter called a semantic parser is used to convert the natural language into the formal language. In general, the question/answer system using the knowledge base converts a user's question expressed in the natural language into an expression in the formal language using the converter, extracts an answer corresponding to the converted expression from the knowledge base, and presents it to the user.

In the above technical field, non-patent literature 1 discloses a technique of narrowing a search range by performing pruning in a case in which the number of outputtable expressions in a formal language is too large because of an enormous vocabulary of the formal language, and it is impossible to calculate all expressions. On the other hand, in non-patent literature 2, all outputtable expressions in a formal language are listed using dynamic programming, instead of narrowing the search range by pruning as in non-patent literature 1.

CITATION LIST

Patent Literature

Non-patent literature 1: Percy Liang, Michael Jordan, and Dan Klein. 2011. Learning dependency-based compositional semantics. In Proceedings of the Human Language Technology Conference of the Association for Computational Linguistics, pages 590-599, Portland, Oreg.

Non-patent literature 2: Panupong Pasupat, Percy Liang. Inferring logical forms from denotations. Association for Computational Linguistics (ACL), 2016

SUMMARY OF THE INVENTION

Technical Problem

In the technique described in non-patent literature 1, however, in some cases, positive examples are pruned, and it is impossible to appropriately update parameters and normally perform learning. Additionally, in the technique described in non-patent literature 2, to find a few positive examples, a large number of negative examples need to be calculated, and machine learning cannot efficiently be progressed.

The present invention enables to provide a technique of solving the above-described problem.

Solution to Problem

One example aspect of the present invention provides an information processing apparatus for learning parameters of a converter that converts a question in a natural language into a query expression in a formal language, comprising:

an input acceptor that accepts an input of a set of a question in the natural language and a correct answer that is an appropriate output to the question;

a positive example condition generator that generates at least one condition to be satisfied by the formal language input on searching a search database for the correct answer, based on data associated with the formal language stored in the search database;

a query expression generator that generates a query expression in the formal language corresponding to the question using parameters of the converter to satisfy any of the at least one condition;

an answer acquirer that acquires an answer to the question based on a search of the search database using the generated query expression; and a parameter updater that updates the parameters of the converter such that the question is converted with priority into the generated query expression when the answer and the correct answer match.

Another example aspect of the present invention provides an information processing method for learning parameters of a converter that converts a question in a natural language into a query expression in a formal language, comprising:

accepting an input of a set of a question in the natural language and a correct answer that is an appropriate output to the question;

generating at least one condition to be satisfied by the formal language input on searching a search database for the correct answer, based on data associated with the formal language stored in the search database;

generating a query expression in the formal language corresponding to the question using the parameters of the converter to satisfy any of the at least one condition;

acquiring an answer to the question based on a search of the search database using the generated query expression; and updating the parameters of the converter such that the question is converted with priority into the generated query expression when the answer and the correct answer match.

Still other example aspect of the present invention provides an information processing program for learning parameters of a converter that converts a question in a natural language into a query expression in a formal language, the information processing program causing a computer to execute a method comprising:

accepting an input of a set of a question in the natural language and a correct answer that is an appropriate output to the question;

generating at least one condition to be satisfied by the formal language input on searching a search database for the correct answer, based on data associated with the formal language stored in the search database;

generating a query expression in the formal language corresponding to the question using the parameters of the converter to satisfy any of the at least one condition;

acquiring an answer to the question based on a search of the search database using the generated query expression; and updating the parameters of the converter such that the question is converted with priority into the generated query expression when the answer and the correct answer match.

Still other example aspect of the present invention provides an information processing system for learning parameters of a converter that converts a question in a natural language into a query expression in a formal language, comprising:

a search apparatus that searches a search database for an answer using a query expression in the formal language and outputs the answer;

an information processing apparatus for learning the parameters of the converter; and a parameter storage unit that stores the parameters of the converter, wherein the information processing apparatus comprises:

an input acceptor that accepts an input of a set of a question in the natural language and a correct answer that is an appropriate output to the question;

a positive example condition generator that generates at least one condition to be satisfied by the formal language input on searching the search database for the correct answer, based on data associated with the formal language stored in the search database;

a query expression generator that generates a query expression in the formal language corresponding to the question using the parameters of the converter from the parameter storage unit to satisfy any of the at least one condition;

an answer acquirer that acquires an answer to the question from the search apparatus that has searched the search database using the generated query Advantageous Effects of Invention According to the present invention, it is possible to efficiently perform machine learning of a converter that converts a natural language into a formal language even in a case in which the number of outputtable expressions in the formal language is large.

BRIEF DESCRIPTION OF DRAWINGS

FIG. 5 is a view showing an example of parameters in a parameter storage unit according to the second example embodiment of the present invention;

FIG. 11 is a view showing an example of a parameter table in the query expression generator according to the second example embodiment of the present invention;

FIG. 13 is a view showing an example of a query expression generated by the query expression generator according to the second example embodiment of the present invention;

FIG. 14 is a view showing an updating example of the parameters in the parameter storage unit according to the second example embodiment of the present invention;

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 according to the first example embodiment of the present invention will be described with reference to FIG. 1. The information processing apparatus 100 is an apparatus configured to learn the parameters of a converter that converts a question in a natural language into a query expression in a formal language.

Figure 1:
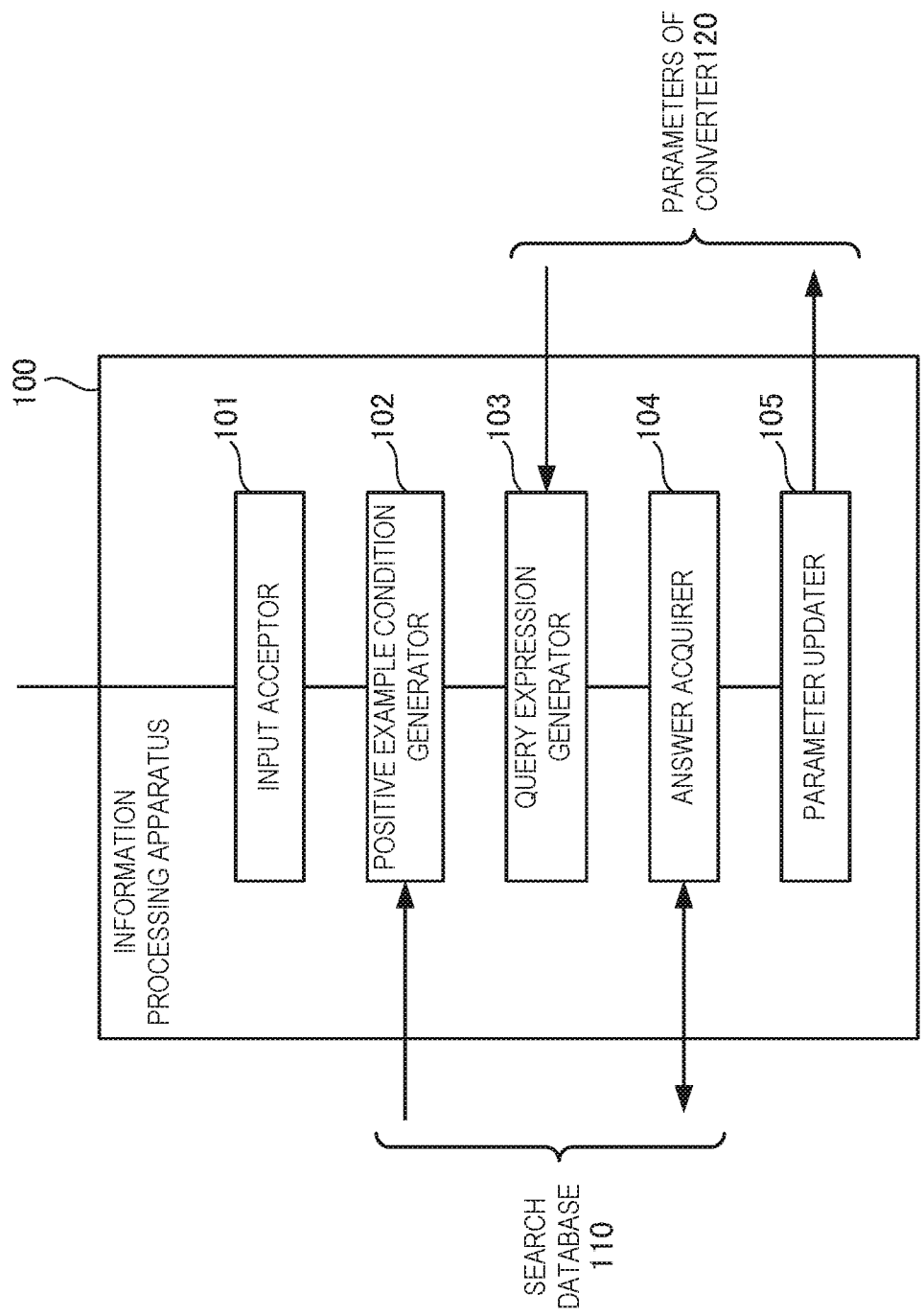
FIG. 1 is a block diagram showing the functional arrangement of an information processing apparatus according to the first example embodiment of the present invention.

As shown in FIG. 1, the information processing apparatus 100 includes an input acceptor 101, a positive example condition generator 102, a query expression generator 103, an answer acquirer 104, and a parameter updater 105. The input acceptor 101 accepts an input of a set of a question in a natural language and a correct answer that is an appropriate output for the question. Based on data associated with a formal language stored in a search database 110, the positive example condition generator 102 generates at least one condition to be satisfied by the formal language input on searching the search database 110 for the correct answer. The query expression generator 103 generates a query expression in the formal language corresponding to the question using parameters 120 of a converter to satisfy any of the at least one condition. An answer acquirer 104 acquires an answer to the question based on the search of the search database 110 using the generated query expression. The parameter updater 105 updates the parameter 120 of the converter such that the question is converted with priority into the generated query expression in a case in which the answer and the correct answer match.

According to this example embodiment, at least one condition to be satisfied by the formal language to obtain the correct answer is generated based on the data associated with the formal language stored in the search database. The query expression is generated to satisfy any of the at least one condition, and the parameter of the converter is updated. This makes it possible to efficiently perform machine learning of the converter even in a case in which the number of outputtable expressions in the formal language is large.

Second Example Embodiment

An information processing apparatus according to the second example embodiment of the present invention will be described next. The information processing apparatus according to this example embodiment implements efficient machine learning of a converter using a search system that searches a search database for an answer to a question, and a parameter storage unit that stores the parameter of the converter.

<<Explanation of Technical Premises>>

To clarify efficient machine learning of the converter by the information processing apparatus according to this example embodiment, the technical premises in the technical field will be described first.

In recent years, a large-scale knowledge base can be acquired via the Internet, and research on a system configured to make a question/answer using the knowledge base has proceeded. The knowledge base used in such a system is generally structured to extract knowledge corresponding to a query described in a formal language. As the formal language, for example, Prolog, RDF, or the like is used.

Even in a case in which a question/answer system using a knowledge base capable of making a query using a formal language as described above, a user's question is generally expressed in a natural language. For this reason, to extract knowledge corresponding to the user's question from the knowledge base, the user's question expressed in the natural language needs to be converted into an expression in the formal language.

Conventionally, a converter called a semantic parser is used to convert the natural language into the formal language. In general, the question/answer system using the knowledge base converts a user's question expressed in the natural language into an expression in the formal language using the converter, extracts an answer corresponding to the converted expression from the knowledge base, and presents it to the user.

For example, assume that a user inputs a question "Who is Alice's father?" in a natural language to a question/answer system using a knowledge base capable of making a query by Prolog. In this case, the question/answer system first converts the question in the natural language into a query expression "father(X,alice)" in Prolog by a converter. After that, the question/answer system extracts knowledge corresponding to the query expression from the knowledge base, and presents it to the user as the answer to the question.

To extract an appropriate answer to the user's question from the knowledge base, it is necessary to appropriately grasp the semantic structure of the user's question and convert the question in the natural language into an expression in the formal language suitable for the knowledge base. However, since there are a variety of expressions in the natural language, it is difficult to manually construct rules to appropriately convert a user's question in the natural language into an expression in the formal language.

Hence, there has been proposed a technique of automatically constructing a converter suitable for an arbitrary knowledge base using machine learning (for example, see non-patent literature 1).

In the technique described in non-patent literature 1, questions in the natural language and correct answers to the questions are prepared in advance. A prepared question in the natural language is converted into a plurality of expressions in the formal language by a converter. More specifically, the converter performs conversion from the natural language to the formal language based on parameters set in advance. Additionally, in the technique described in non-patent literature 1, answers corresponding to the plurality of expressions in the formal language generated by the converter are extracted from the knowledge base, and the plurality of extracted answers are compared with the correct answer prepared in advance. Then, based on the result of comparison between the plurality of extracted answers and the correct answer prepared in advance, the above-described parameter is updated such that a correct answer can be obtained for the user's question.

As described above, in the technique described in non-patent literature 1, the parameter is updated by machine learning using a positive example and a negative example. In this case, a positive example is an expression that can obtain a correct answer, and a negative example is an expression that cannot obtain a correct answer. When the parameter is updated such that the score of the positive example becomes higher than the score of the negative example, the converter is improved to easily output an expression capable of obtaining a correct answer.

However, if the vocabulary of the formal language is enormous, the number of outputtable expressions in the formal language may be too large, and it may be impossible to calculate all expressions. In a case in which the formal language includes a large number of predicates or a large number of constants, the number of expressions that are candidates in the formal language becomes enormous because the expressions are formed by combining the predicates or constants, and a combinatorial explosion occurs. In addition, only a few of these expressions in the formal language are positive examples, and all the remaining expressions are negative examples. From the viewpoint of calculation time, it is difficult to calculate all the expressions and find a positive example. In machine learning, however, since the learning is performed by comparing positive examples and negative examples, correct learning cannot be performed until a sufficient number of positive examples are found.

To solve this problem, in the technique described in non-patent literature 1, when the number of outputtable expressions in the formal language is large, the search range is narrowed by performing pruning. More specifically, if a large number of expressions in the formal language are obtained halfway through the search algorithm, a score representing a likelihood is calculated for each expression, only expressions with higher scores are left, and the process advances to the next step. This makes it possible to advance the machine learning without calculating all expressions to be output.

On the other hand, in non-patent literature 2, all outputtable expressions in the formal language are listed using dynamic programming, instead of narrowing the search range by pruning.

(Problems of Technical Premises)

In the technique of non-patent literature 1, however, if the number of expressions that are candidates in the formal language is very large, in some cases, positive examples are pruned, and it is impossible to appropriately update the parameter. In particular, at the initial stage of learning, the learning of the parameter has not proceeded, and a high score cannot be assigned to a positive example. For this reason, all the few existing positive examples are pruned, and only many negative examples are left as candidates. If no positive example exists, the parameter cannot be updated. Hence, in this case, the learning cannot normally be performed.

On the other hand, in non-patent literature 2, all outputtable expressions in the formal language are listed using dynamic programming, instead of performing pruning. When this technique is used, positive examples can always be found. However, to find a few positive examples, a large number of negative examples need to be calculated. This impedes efficient progress of machine learning.

<<Explanation of this Example Embodiment>>

In this example embodiment, at least one condition to be satisfied by the formal language to obtain a correct answer is generated based on data associated with the formal language stored in the search database, and a query expression is generated to satisfy any of the at least one condition. This makes it possible to efficiently perform machine learning of the converter even in a case in which the number of outputtable expressions in the formal language is large.

When generating a condition according to this example embodiment, a formal language necessary for searching for a correct answer is acquired from the search database. Furthermore, a formal language of a lower layer necessary for searching for the acquired formal language is acquired from the search database and set as a condition.

In addition, when generating a query expression according to this example embodiment, a question is divided into at least two word sequences, and a formal language is assigned to each word sequence using the parameter of the converter to satisfy any of the at least one condition, thereby generating a query expression in the formal language. For example, an importance used to output a correct answer is evaluated for each condition. Priority is given to a formal language included in a condition of a high importance over the formal language included in a condition of a low importance, and a plurality of query expressions in the formal language are thus generated, thereby acquiring a plurality of answers to the question using the plurality of query expressions in the formal language.

Additionally, in parameter updating according to this example embodiment, an error between an answer and a correct answer is calculated. When the error is smaller than a threshold, it is determined that the answer and the correct answer match, and the parameter is updated.

The machine learning of the parameter according to this example embodiment is repeated until the probability that an answer and a correct answer match exceeds a threshold, until the probability that an answer and a correct answer mismatch falls below a threshold, or until the updating count equals a threshold.

<<Information Processing System Including Information Processing Apparatus>>

Figure 2:
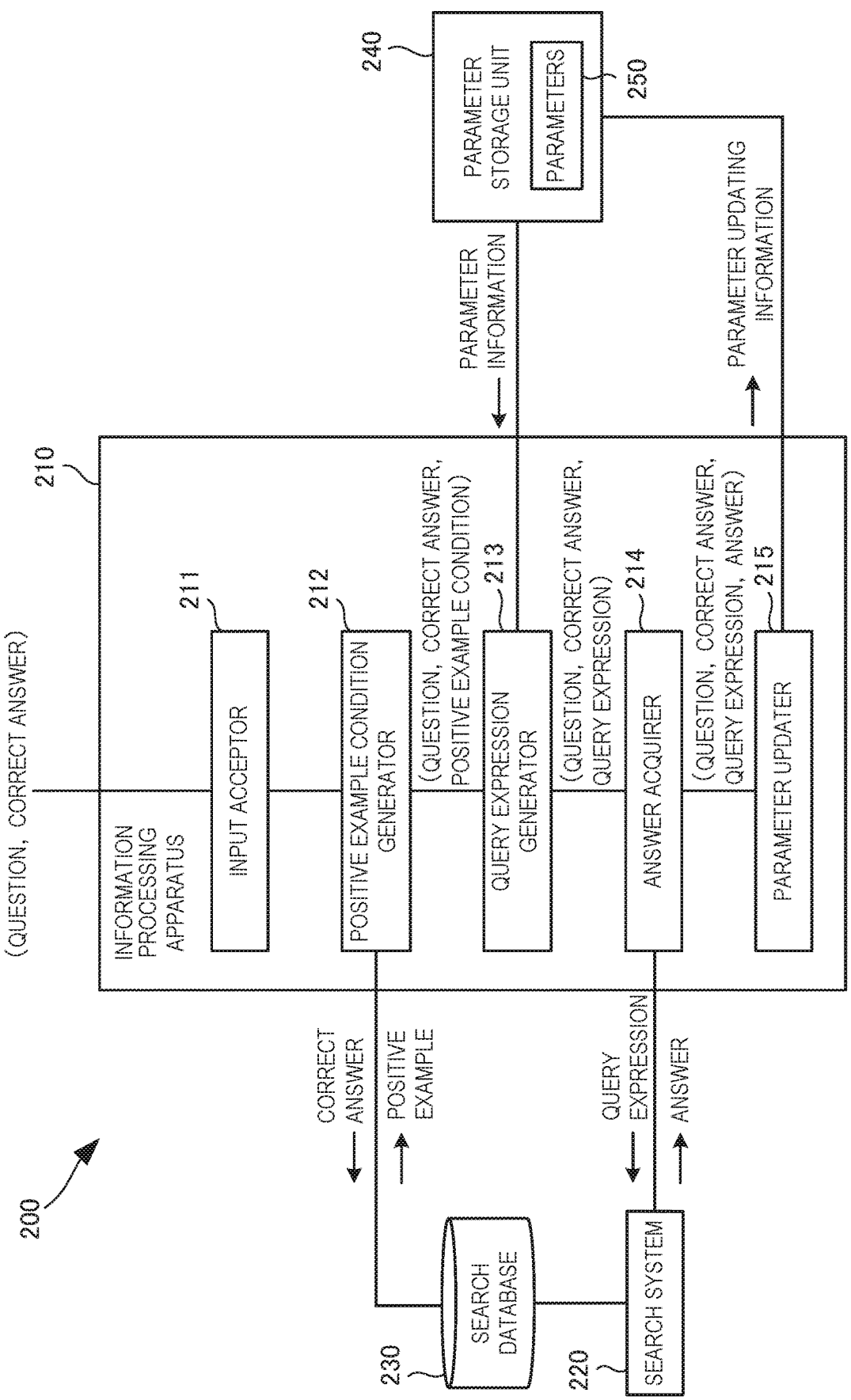
FIG. 2 is a block diagram showing the arrangement of an information processing system including an information processing apparatus according to the second example embodiment of the present invention.

FIG. 2 is a block diagram showing the arrangement of an information processing system 200 including an information processing apparatus 210 according to this example embodiment.

The information processing apparatus 210 according to this example embodiment shown in FIG. 2 is an apparatus including a search database 230, a search system 220, and a parameter storage unit 240 as processing targets and configured to perform machine learning by updating parameters 250 stored in the parameter storage unit 240.

Before an explanation of the arrangement of the information processing apparatus 210, the search database 230, the search system 220, and the parameter storage unit 240, which are the processing targets of the information processing apparatus 210, will be described in detail.

(Search System)

The search system 220 accepts, as the input, a query that is an expression in a formal language, calculates an answer using data included in the search database 230, and outputs the obtained answer. The search system 220 may be, for example, a database management system that accepts, as the input, a query described in SQL (Structured Query Language) that is a database inquiry language. The search system 220 may be a Prolog engine that accepts, as the input, a query described in Prolog that is a logic programming language.

Hereinafter, the search system 220 is assumed to be a system that receives an expression formed by combining a constant and a function and returns the calculation result of the expression, and the search database 230 is assumed to store the argument and the return value of each function in a table format. In addition, here, the number of arguments is assumed to be one for all functions. However, the number is not limited.

(Search Database)

Figure 3:
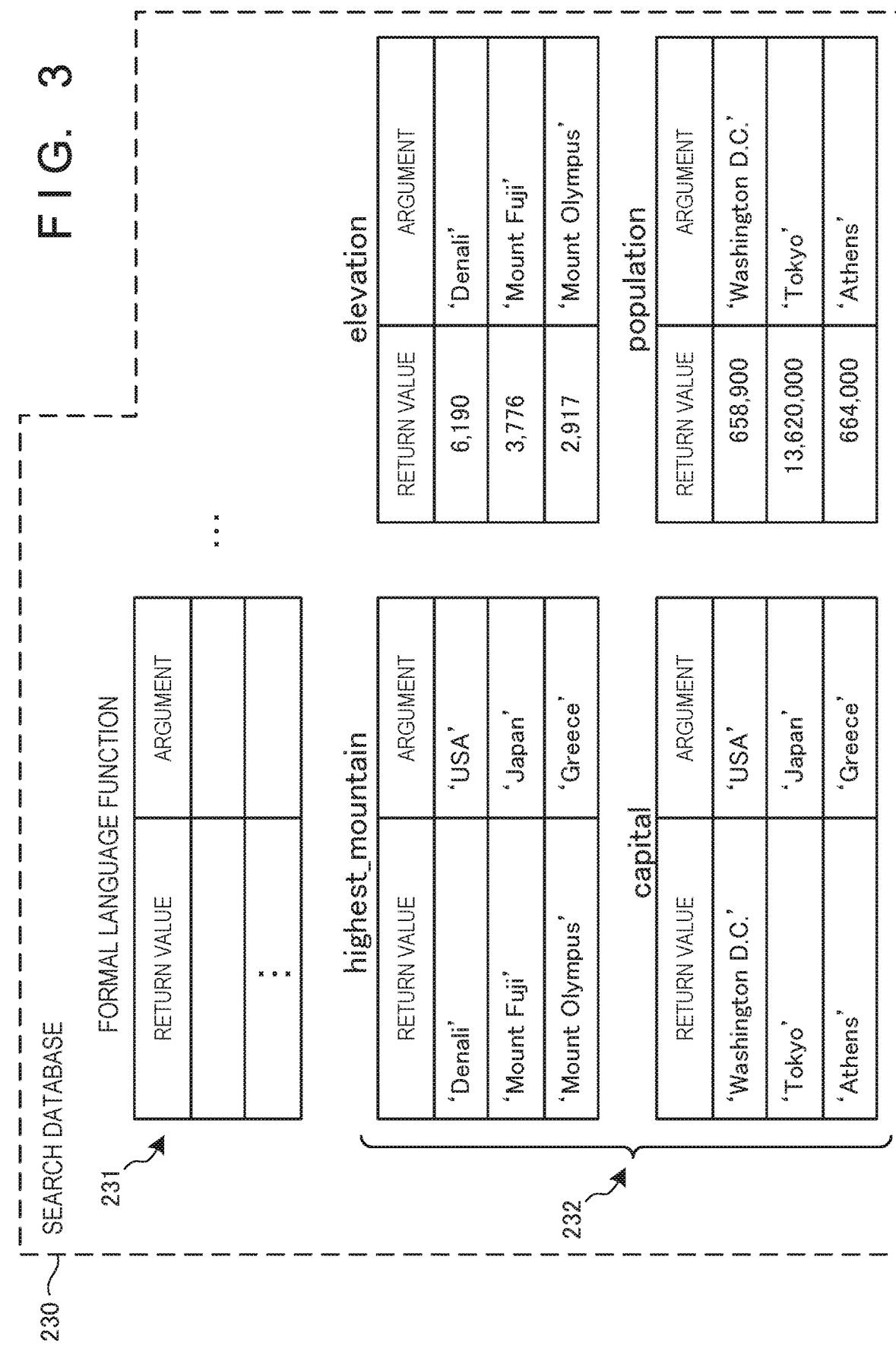
FIG. 3 is a view showing the arrangement of a search database according to the second example embodiment of the present invention.

FIG. 3 is a view showing the arrangement of the search database 230 according to this example embodiment.

Each table 231 stored in the search database 230 stores a function in the formal language of the same name and arguments and return values of the function.

For example, as a detailed example 232 according to this example embodiment, functions such as highest_mountain( ) and elevation( ) in the formal language and the arguments and return values of the functions are stored.

(Question Query Expression and Answer)

Figure 4:
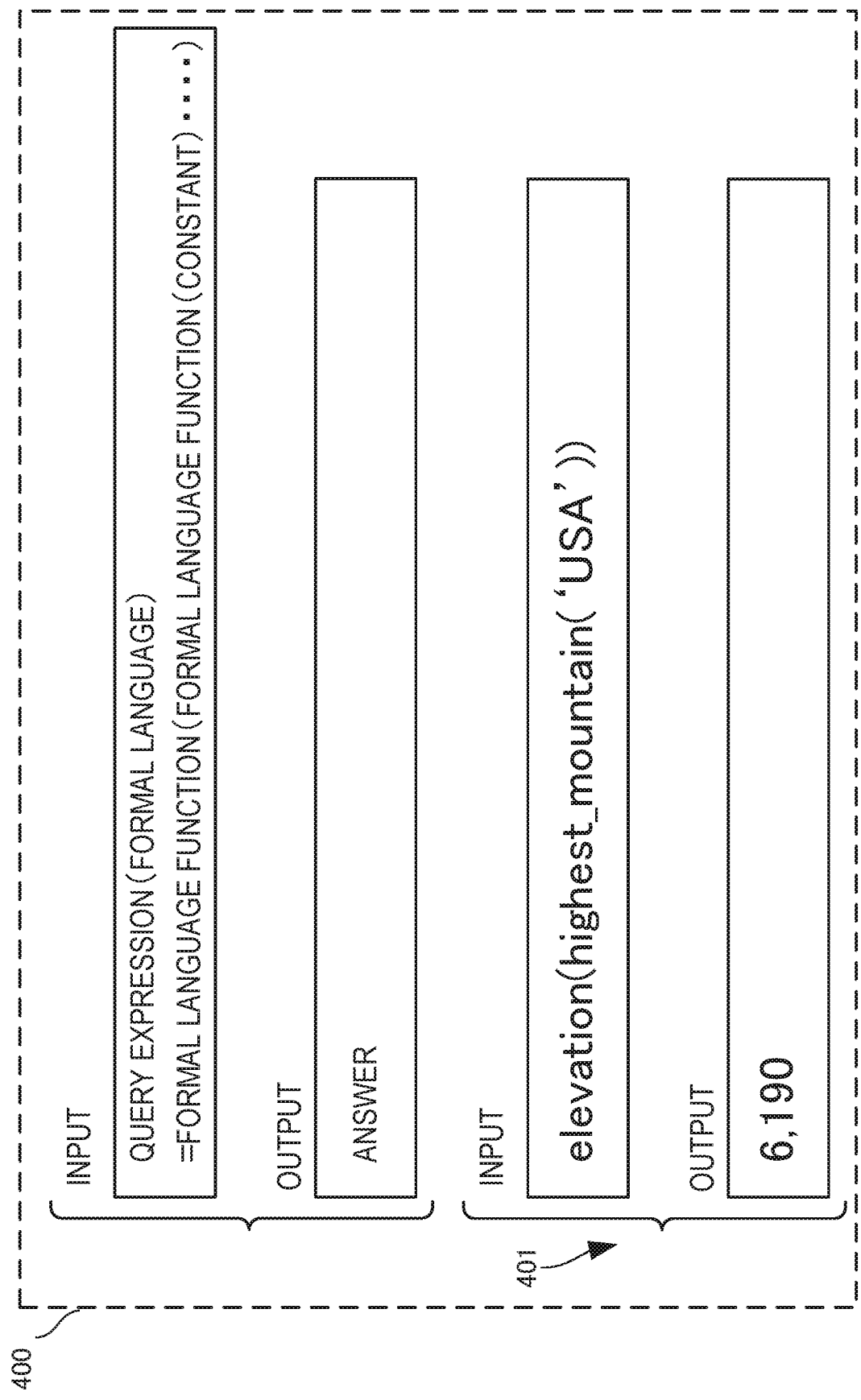
FIG. 4 is a view showing an example of a question query expression input and an answer output for a search system according to the second example embodiment of the present invention.

FIG. 4 is a view showing an example 400 of a question query expression input and an answer output for the search system 220 according to this example embodiment.

The input is a question query expression described in a formal language, which is an expression formed by combining a constant and a function. As shown in FIG. 4, in the question query expression, the return value of a function that uses a constant as the argument is sometimes the argument of a high order function. The output is the answer to the question from the search system 220 for the question query expression.

For example, in a detailed example 401 according to this example embodiment, 'USA' is a constant, and elevation and highest_mountain are functions. This expression indicates that the highest_mountain in the United States of America is obtained, the elevation of the mountain is further obtained, and the result is output as the answer. The output "6,190" is the elevation obtained by the search system 220.

The output from the search system 220 is obtained by referring to data stored in the search database 230 by the search system 220. In the example shown in FIG. 3, the table of the function highest_mountain is referred to using 'USA' as the argument, and 'Denali' that is the return value is obtained. Next, the table of the function elevation is referred to using 'Denali' as the argument, and "6,190" that is the return value is obtained, thereby outputting the answer "6,190".

(Parameter Storage Unit)

The parameter storage unit 240 stores the parameters 250 of a model used to evaluate an expression in a formal language input to the search system 220. In this example embodiment, a score is calculated using the parameters 250, and machine learning of a converter that outputs an expression of a high answer is performed. Note that the model whose parameter 250 is stored in the parameter storage unit 240 can be any model as long as it can evaluate the adaptability between an input text in a natural language and a generated query expression.

(Parameter)

FIG. 5 is a view showing an example of the parameters 250 in the parameter storage unit 240 according to this example embodiment.

In this example embodiment, as a model 551 whose parameter 250 is stored in the parameter storage unit 240, a model that gives a weight to the pair of a phrase in a natural language and a word in a formal language is used. If a pair of a phrase in the natural language and a word in the formal language readily appears in a pair of a question in the natural language and a query expression, in correct conversion, the pair has a positive weight. If the pair hardly appears in the pair of the question in the natural language and the query expression in correct conversion, the pair has a negative weight. In this case, the weight given to each pair is a parameter.

If there is the model 551, the adaptability of a generated query expression can be evaluated for a question in the natural language. That is, a weight is calculated for a pair of a phrase that appears in the question in the natural language and the word of a query expression corresponding to the phrase. A value obtained by totaling the weights is used as a score. If the score is positive, the query expression can be evaluated as correct. If the score is negative, the query expression can be evaluated as incorrect.

In a detailed example 552 according to this example embodiment, concerning three phrases in the natural language divided from a question, weights for pairs with words in the formal language are described. In this example, all the weights are set to 0.0 (zero) in the initial state. This represents an unlearned state in which no information is obtained yet for any pair.

Note that FIG. 5 shows only the examples of three phrases. However, in addition to these, the parameter storage unit 240 may store various phrases that can appear in a question in the natural language.

<<Functional Arrangement of Information Processing Apparatus>>

The information processing apparatus 210 according to this example embodiment operates using the search database 230, the search system 220, and the parameter storage unit 240 described above as the processing targets.

More specifically, the information processing apparatus 210 accepts, as the input, a pair of a question and a correct answer, and converts the question into a query expression. When converting, by referring to the search database 230, the information processing apparatus 210 acquires at least one condition to be satisfied by a query expression whose result is a positive example, and performs conversion to give priority to a query that satisfies the condition. The information processing apparatus 210 inputs the query expression obtained by the conversion to the search system 220, and obtains an answer from the search system 220 as the output. The parameters 250 stored in the parameter storage unit 240 is updated to give a high evaluation to an answer in a case in which the answer returned from the search system 220 matches the correct answer.

As shown in FIG. 2, the information processing apparatus 210 includes an input acceptor 211, a positive example condition generator 212, a query expression generator 213, an answer acquirer 214, and a parameter updater 215.

The input acceptor 211 accepts a pair of a question and a correct answer as the input from the outside, and outputs the accepted contents to the positive example condition generator 212.

The positive example condition generator 212 receives the question and the correct answer as the input, acquires at least one condition to be satisfied by a query expression whose result is a positive example as a positive example condition by referring to the search database 230, and outputs the question, the correct answer, and the positive example condition to the query expression generator 213. The query expression whose result is a positive example is a query expression for which when the query expression is input to the search system 220, the answer output from the search system 220 matches the correct answer.

The query expression generator 213 receives the question, the correct answer, and the positive example condition as the input. The query expression generator 213 generates a query expression corresponding to the question such that priority is given to a query that satisfies the condition generated by the positive example condition generator 212. More specifically, the query expression generator 213 makes an inquiry to the parameter storage unit 240, thereby acquiring the parameters 250 of the model stored in the parameter storage unit 240. The query expression generator 213 then generates a query expression that satisfies the positive example condition and has a high score by the model decided by the parameters 250 in query expressions considered as query expressions in the formal language corresponding to the question sentence in the natural language. The query expression generator 213 outputs the question, the query expression, and the correct answer to the answer acquirer 214.

The answer acquirer 214 receives the question, the query expression, and the correct answer from the query expression generator 213, makes an inquiry to the search system 220 using the received query expression, and obtains an answer to the query expression. The answer acquirer 214 outputs the question, the query expression, the correct answer, and the answer to the parameter updater 215.

The parameter updater 215 accepts the question, the query expression, the correct answer, and the answer from the answer acquirer 214. The parameters 250 stored in the parameter storage unit 240 is updated such that in a case in which the answer by the search system 220 matches the correct answer, the query expression generated by the query expression generator 213 is regarded as a positive example, and the query expression is given a high evaluation as the result converted from the question.

These operations will be described below in detail together with the processing of the functional components of the information processing apparatus 210.

<<Processing Procedure by Functional Components of Information Processing Apparatus>>

Figure 6:
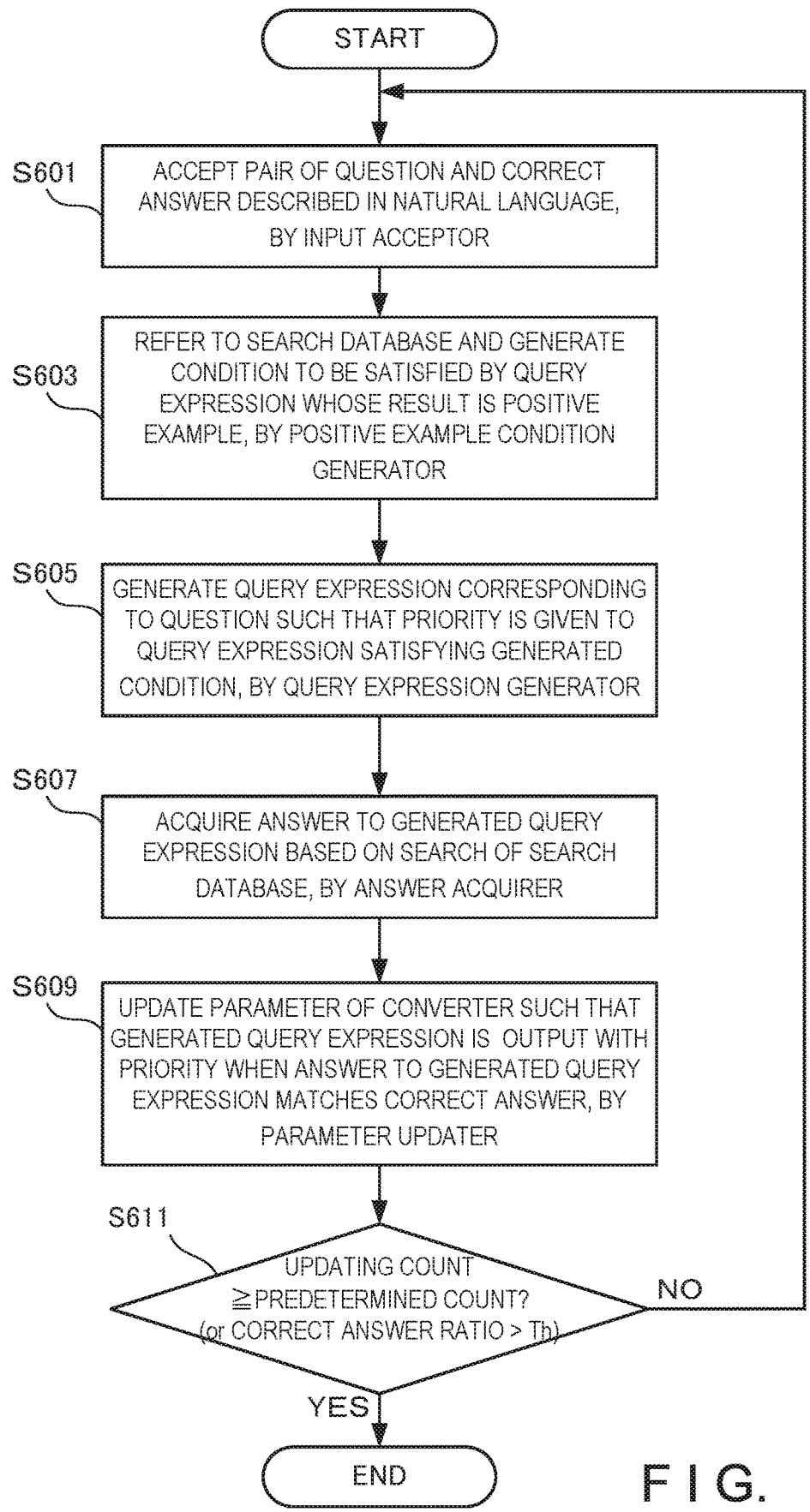
FIG. 6 is a flowchart showing a processing procedure by the functional components of the information processing apparatus according to the second example embodiment of the present invention.

FIG. 6 is a flowchart showing a processing procedure by the functional components of the information processing apparatus 210 according to this example embodiment. In the following description, a reference to FIGS. 2 to 5 will be made as needed. Additionally, in this example embodiment, an information processing method according to this example embodiment is executed by operating the information processing apparatus 210. Hence, the description of the operation of the information processing apparatus 210 is substituted for the description of the information processing method according to this example embodiment.

(Processing of Input Acceptor: S601)

As shown in FIG. 6, the input acceptor 211 accepts, as the input, a pair of a question and a correct answer, and outputs the accepted contents to the positive example condition generator 212.

Figure 7:
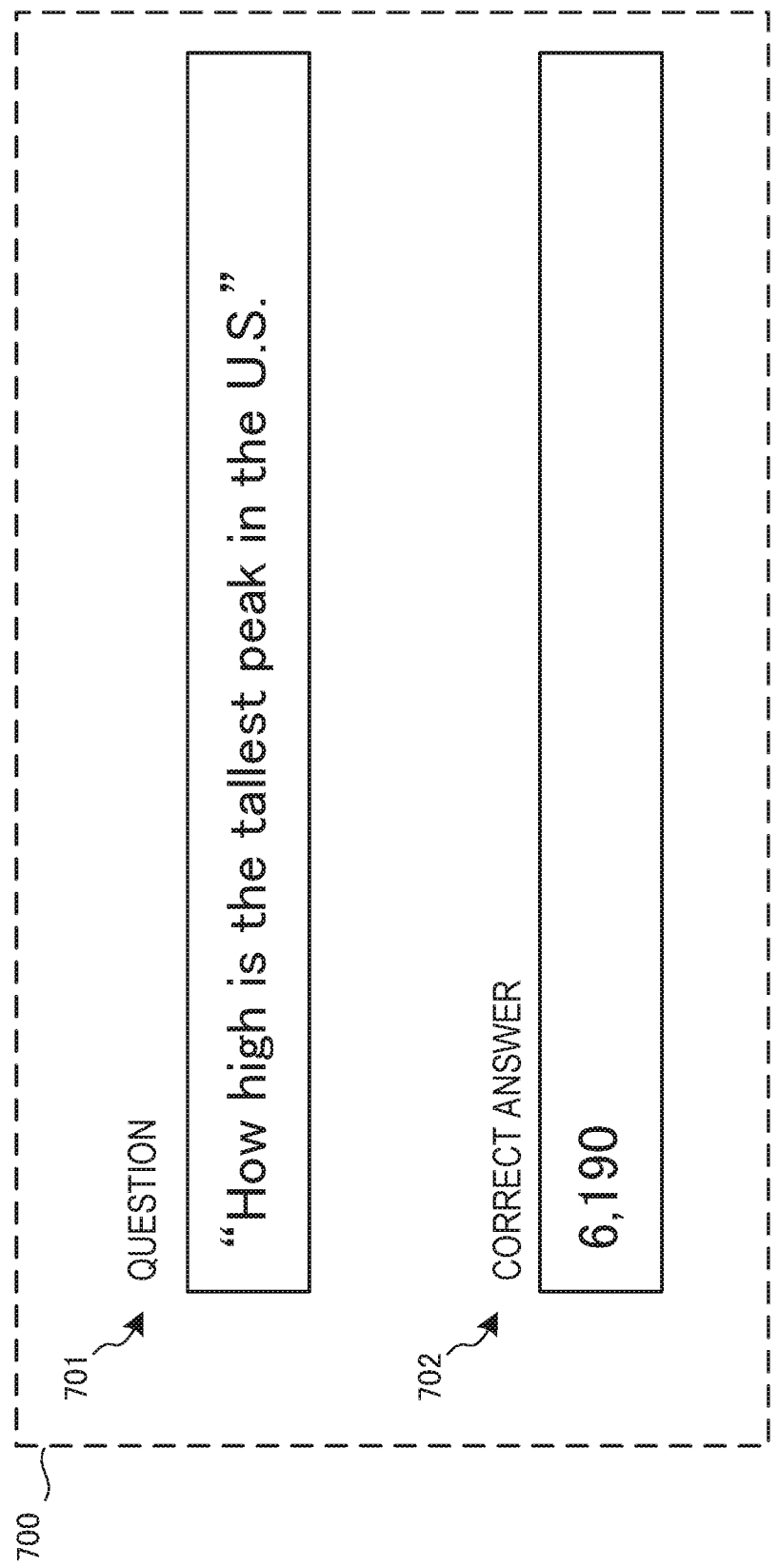
FIG. 7 is a view showing an example of an input of an input acceptor according to the second example embodiment of the present invention.

FIG. 7 is a view showing an example 700 of the input to the input acceptor 211 according to this example embodiment.

FIG. 7 shows a detailed example to be described in this example embodiment. A question 701 is described in the natural language. On the other hand, a correct answer 702 can be described either in the natural language or in the formal language as long as it can be compared with the output of the search system 220.

(Processing of Positive Example Condition Generator: S603)

The positive example condition generator 212 acquires conditions to be satisfied by a query expression whose result is a positive example by referring to the search database 230. The query expression whose result is a positive example is a query expression for which when the query expression is input to the search system 220, the answer output from the search system 220 matches the correct answer.

Figure 8:
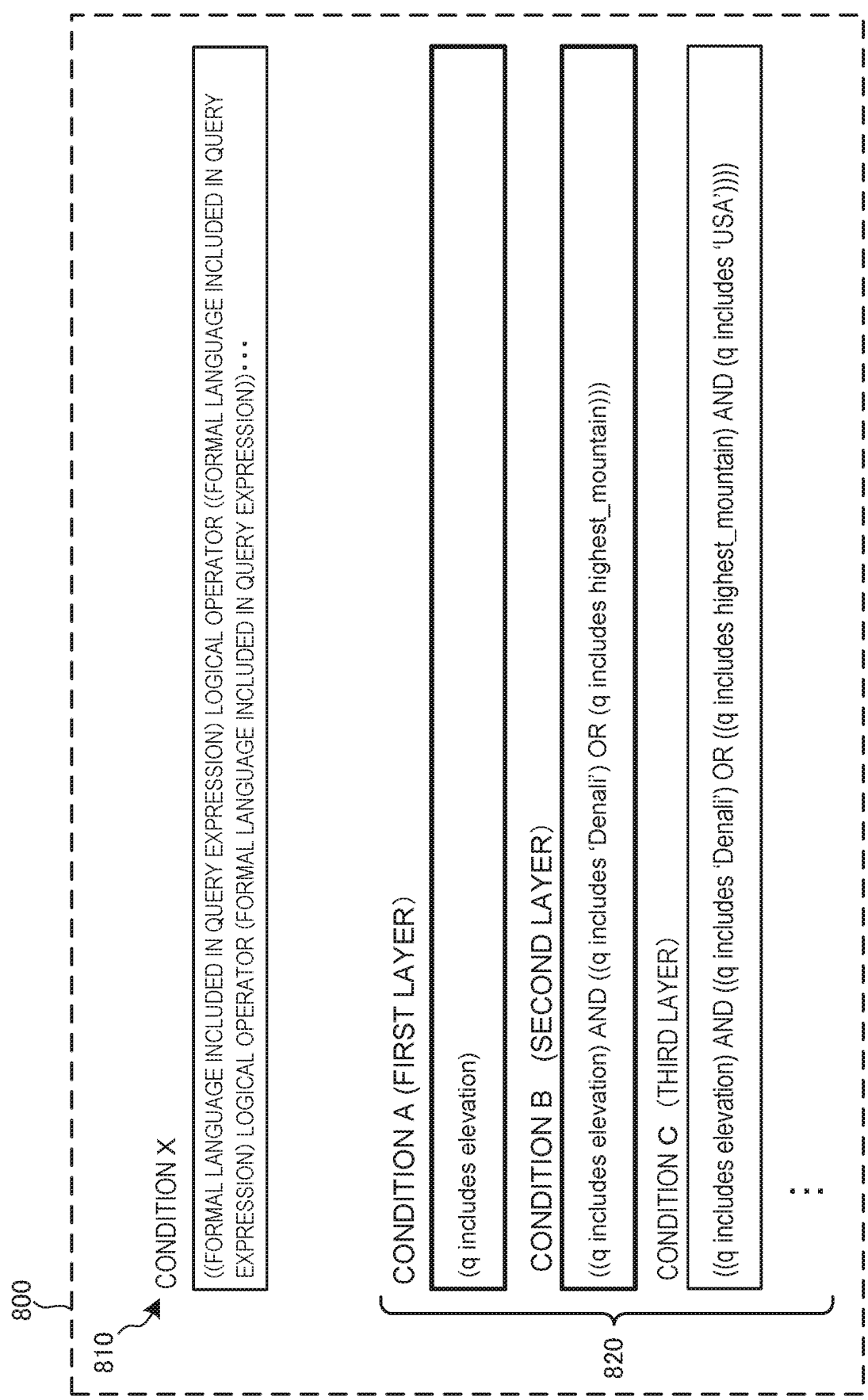
FIG. 8 is a view showing an example of a condition generated by a positive example condition generator according to the second example embodiment of the present invention.

FIG. 8 is a view showing an example of a condition generated by the positive example condition generator 212 according to this example embodiment.

A condition X 810 generated by the positive example condition generator 212 is a condition in which formal languages that shall be included in a query expression used by the search system 220 to return the correct answer accepted by the input acceptor 211 are connected by logical operators in consideration of the association of tables in the search database 230. As such a condition, stricter conditions can be generated in order so as to include, for example, the condition of a first layer including a constant or a function of the formal language that directly outputs the correct answer as a return value, the condition of a second layer including an argument in a case in which the argument of the first layer becomes the return value of the function of the formal language, and the condition of a third layer including an argument in a case in which the argument of the second layer becomes the return value of the function of the formal language.

As described above, the condition acquired by the positive example condition generator 212 can automatically be acquired simply by checking data stored in the search database 230, specifying an entry in which the correct answer appears, and calculating the condition of a query expression necessary to return the entry. Furthermore, from the thus obtained condition, a more detailed condition can be obtained by checking the condition of an expression for obtaining the value that appears in the condition.

In a detailed example 820 according to this example embodiment, q that appears in the condition represents a query. "q includes x" represents a condition that the query q includes a constant or a function x.

A condition A (first layer) of the detailed example 820 shown in FIG. 8 is obtained in the following way. In a case in which the correct answer is "6,190", according to the data of the search database 230 shown in FIG. 3, this correct answer is obtained as a return value when the argument 'Denali' is given to the function elevation. Accordingly, a condition that the query expression whose result is a positive example includes the function elevation can be acquired. This is the condition A of the first layer. As a query expression that satisfies the condition A, for example, elevation ('Denali') can be considered.

In addition, a condition B (second layer) of the detailed example 820 shown in FIG. 8 is an expansion of the condition A, and is acquired by further checking the condition of the expression for obtaining the value that appears in the condition A. That is, "6,190" is obtained as the return value of the expression elevation ('Denali'). If the query expression includes elevation but not 'Denali', the query expression needs to further include a condition having 'Denali' as a return value.

According to the search database 230, the condition having 'Denali' as a return value is highest_mountain ('USA'). Hence, when the query expression includes elevation, it is considered that the query expression further includes 'Denali' or the function highest_mountain. This is represented by the condition B of the second layer.

Furthermore, a condition C (third layer) of the detailed example 820 shown in FIG. 8 is an expansion of the condition B, and is acquired by further checking the condition of the expression for obtaining the value that appears in the condition B. That is, according to the search database 230, to obtain 'Denali' as the return value of the function highest_mountain, 'USA' needs to be used as the argument. Hence, when the query expression includes elevation, it is considered that the query expression further includes 'Denali' or the function highest_mountain and its argument 'USA'. This is represented by the condition C of the third layer.

The condition B or the condition C can be obtained by inquiring of the search database 230 about the value necessary to output "6,190" and thus obtaining 'Denali' and further inquiring of the search database 230 about the value necessary to output 'Denali'.

As described above, when acquiring a constant or function necessary to return a certain value is repeated, the condition of a query whose result is a positive example can be calculated. This processing can automatically be executed as an inquiry to the search database 230.

In the detailed example according to this example embodiment, the condition A and the second layer of the condition B are used as the positive example conditions in the query expression generator 213. Here, if only the condition A is used, the condition is ambiguous. If all the conditions up to the condition C are used, the conditions are strict. The accuracy or speed of machine learning changes depending on how deep the condition used is.

Note that the condition generated by the positive example condition generator 212 need not always be expressed by the format using a logical operator as shown in FIG. 8. For example, the condition may be expressed by a simple format such as a list of words that should be included in a positive example.

(Processing of Query Expression Generator: S605)

The query expression generator 213 generates a query corresponding to the question such that priority is given to a query that satisfies the condition output from the positive example condition generator 212 to the query expression generator 213. More specifically, the query expression generator 213 makes an inquiry to the parameter storage unit 240, thereby acquiring the parameters 250 of the model stored in the parameter storage unit 240. The query expression generator 213 then generates with priority a query expression that satisfies the positive example condition and is evaluated high by the model decided by the parameter in queries considered as queries in the formal language corresponding to the question sentence in the natural language.

Figure 9:
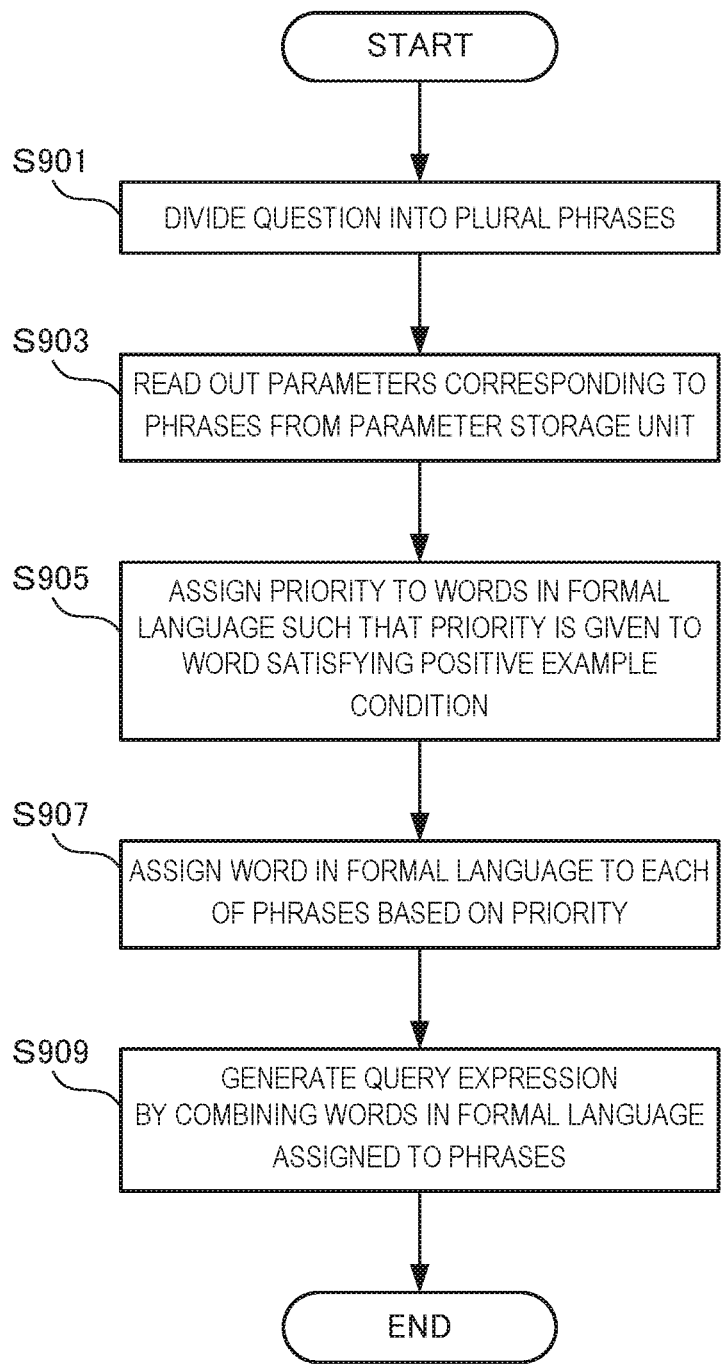
FIG. 9 is a flowchart showing the processing procedure of a query expression generator according to the second example embodiment of the present invention.

FIG. 9 is a flowchart showing the processing procedure of the query expression generator according to this example embodiment.

(Phrase Division Processing: S901)

The query expression generator 213 divides the question in the natural language into a plurality of phrases.

Figure 10:
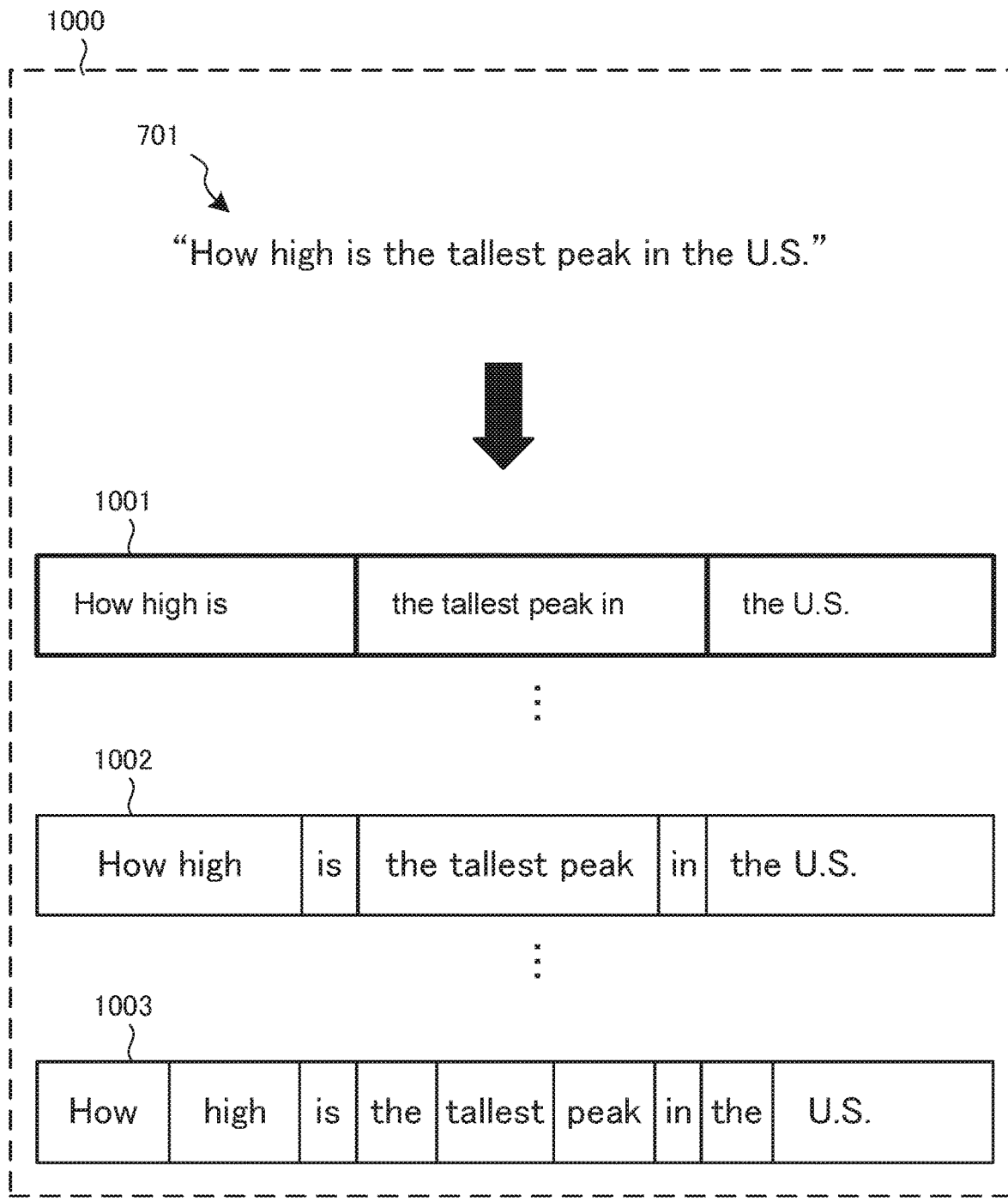
FIG. 10 is a view showing an example of phrase division processing by the query expression generator according to the second example embodiment of the present invention.

FIG. 10 is a view showing an example 1000 of phrase division by the query expression generator 213 according to this example embodiment.

The question 701 "How high is the tallest peak in the U.S." shown in FIG. 7 undergoes various divisions 1001 to 1003 in accordance with a known division algorithm, and machine learning of the parameter of a query to be converted is performed for each of the divided phrases. This division can be implemented by, for example, regarding the question in the natural language as a train of a plurality of words, selecting one or more of the words by a random number, and performing division between the selected word and the next word. In addition, appropriate division may be selected using a model that is constructed using machine learning and evaluates the appropriateness of the division. For example, appropriate division may be selected using chunking based on Conditional random fields (CRF).

In the detailed example according to this example embodiment, the question 701 "How high is the tallest peak in the U.S." shown in FIG. 7 is divided into three phrases, as indicated by the division 1001.

(Parameter Acquisition Processing: S903)

The query expression generator 213 reads out the parameters 250 corresponding to the phrases from the parameter storage unit 240. In the division example of the question shown in FIG. 10, the detailed example 552 of the parameters shown in FIG. 5 is acquired for the three divided phrases.

(Priority Assignment Processing: S905)

The query expression generator 213 assigns priority to each of words in the formal language such that priority is given to a word included in the positive example condition obtained from the positive example condition generator 212.

FIG. 11 is a view showing an example of a parameter table 1100 in the query expression generator 213 according to this example embodiment. FIG. 11 is a view showing an example of the priority assigned by the query expression generator 213 and the probability of the assignment. In this example, for each word included in the parameters read out from the parameter storage unit 240, if the word is included in the positive example condition, high priority is given.

FIG. 11 shows one phrase "How high is" in detail. The same processing is performed for the remaining phrase as well.

For a word included in the positive example condition, the priority may be changed in accordance with the degree of contribution in the positive example condition. In the condition B shown in FIG. 8, true is obtained in a case in which elevation and 'Denali' are included or in a case in which elevation and highest_mountain are included. In this case, elevation is included in both cases, but 'Denali' and highest_mountain are included in only one of the cases. It can therefore be said that elevation is more important and contributable as a word that constitutes the positive example condition than 'Denali' and highest_mountain.

In the example shown in FIG. 11, the priority is changed in accordance with the degree of contribution in the positive example condition. The priority of elevation is 1.0, and the priority of 'Denali' and highest_mountain is 0.5. The priority is changed in accordance with the degree of contribution.

(Formal Language Assignment: S907)

The query expression generator 213 assigns a word in the formal language to each of phrases in the division 1001 of the question in step S901 based on the priority. In this example embodiment, for each phrase, the probability of assignment of each word in the formal language is calculated based on the weight and the priority, and selection is done at random based on the probability.

FIG. 11 described above shows an example of the probabilities calculated by the query expression generator 213. In particular, FIG. 11 shows the probability of assignment of each word in the formal language to the phrase "How high is". The probability is calculated based on $$Pr(fi) = \frac{\exp(wi + pi)}{\sum_i \exp(wi + pi)} \quad (1)$$

Equation (1) represents that the probability of assignment of each word fi to a certain phrase is calculated based on a weight wi and a probability pi using a value obtained by normalizing exp(wi+pi). That is, the larger the weight in the model is, and the higher the priority is, the higher the probability of assignment becomes.

For example, in FIG. 11, the function elevation is assigned at a probability of 0.181, which is higher than others.

In the above-described way, the query expression generator 213 stochastically assigns a word in the formal language for each phrase.

Figure 12:
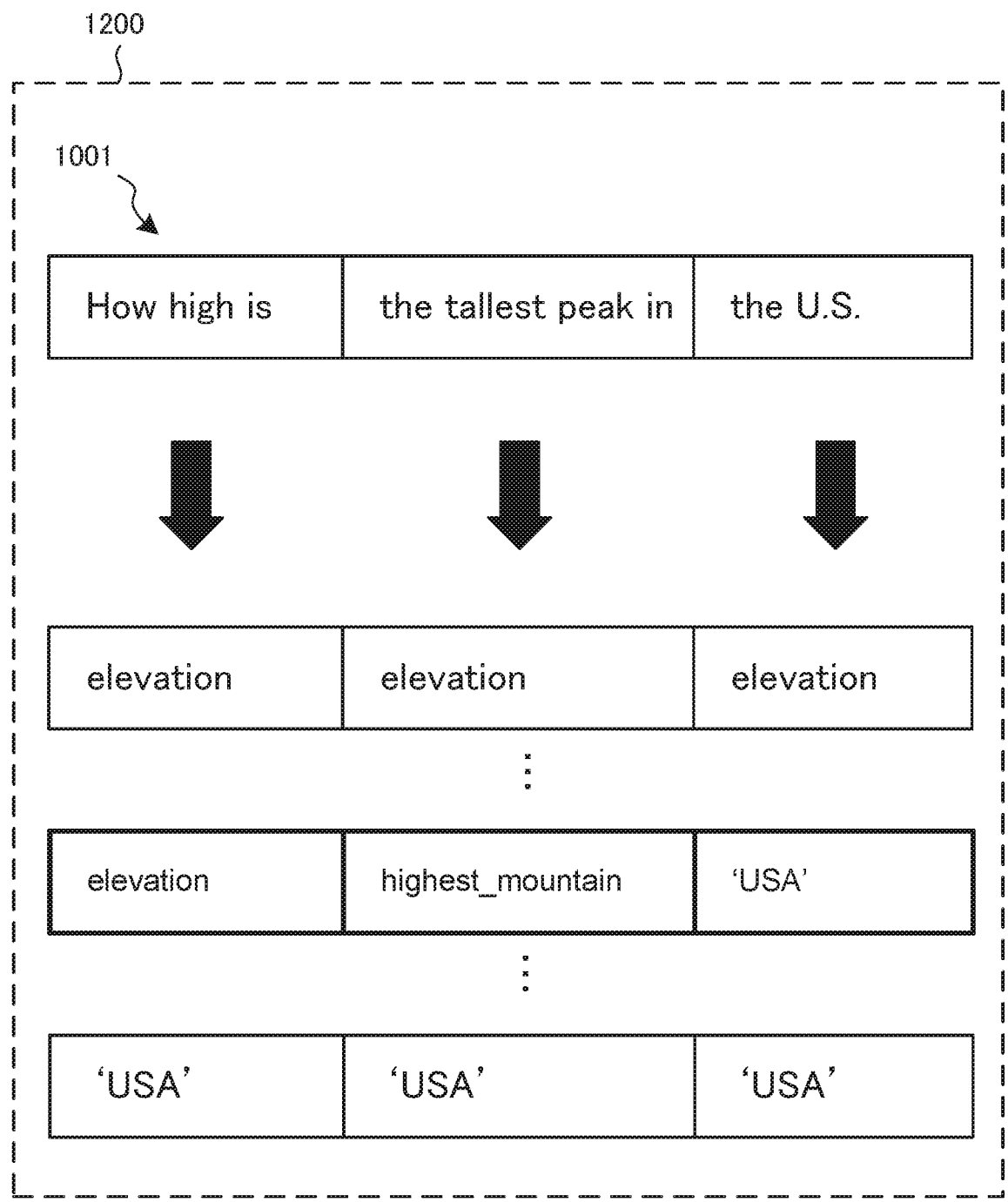
FIG. 12 is a view showing an example of formal language assignment by the query expression generator according to the second example embodiment of the present invention.

FIG. 12 is a view showing an example of formal language assignment by the query expression generator 213 according to this example embodiment. As shown in FIG. 12, a plurality of combinations are generated by the words in the formal language stochastically assigned to the phrases.

(Query Expression Generation Processing: S909)

The query expression generator 213 generates a query expression by combining the words in the formal language assigned to the phrases.

FIG. 13 is a view showing an example 1300 of a query expression generated by the query expression generator 213 according to this example embodiment.

In the example shown in FIG. 12, the words in the formal language stochastically assigned to the phrases are combined, thereby generating a query expression. For example, in a case in which three words are assigned in the order of elevation, highest_mountain, and 'USA', the three words are combined to generate a query expression 1301.

In the above-described way, in step S605, the query expression generator 213 generates a query expression in accordance with the operation procedure shown in steps S901 to S909. In step S605, the words in the formal language are selected based on the probabilities calculated based on priority, thereby easily generating the expression that satisfies the positive example condition. That is, since the three words elevation, 'Denali', and highest_mountain are readily selected, the expression that satisfies the positive example condition shown in FIG. 8 is easily generated.

(Answer Acquisition Processing: S607)

The answer acquirer 214 makes an inquiry to the search system 220, thereby acquiring an answer to the query expression. This is achieved by giving the query expression generated in step S605 by the query expression generator 213 to the search system 220 as the input and receiving the answer output from the search system 220.

For example, for the query expression elevation(elevation (elevation)) or 'USA'('USA'('USA')) shown in FIG. 13, in some cases, the answer is absent, or an answer that is not the correct answer is acquired. On the other hand, when an inquiry to the search system 220 is made using the query expression 1301 shown in FIG. 13, "6,190" that is the correct answer is acquired as the answer.

(Parameter Updating Processing: S609)

The parameter updater 215 updates the parameters 250 of the converter stored in the parameter storage unit 240 such that the query expression is output with priority in a case in which the answer to the query expression and the correct answer match. More specifically, the weight for the pair of the phrase in the natural language and the formal language used to generate the query expression in step S605 is increased.

For example, the answer to the query expression 1301 shown in FIG. 13 is "6,190", which matches the correct answer. That is, this indicates that the query expression 1301 shown in FIG. 13 is a positive example. At this time, 1.0 is added to the weight for the pair of the phrase in the natural language and the formal language used when generating the query expression in step S605.

FIG. 14 is a view showing an updating example 1400 of the parameters 250 in the parameter storage unit 240 according to this example embodiment.

As compared to FIG. 5, the weights of three pairs ("How high is", elevation), ("the tallest peak in", highest_mountain), and ("the U.S.", 'USA') used when generating the query expression 1301 are increased.

When the updating of the parameters is repeated in this way, the weight of a pair used when generating a positive example increases, and the positive example can more easily be obtained.

"The answer to the query expression matches the correct answer" need not always indicate strict matching, and may indicate ambiguous matching. For example, if the error between numerical values is 1% or less, the answer and the correct answer may be regarded as match. In addition, when the answer and the correct answer are character strings, the editing distance between the character strings may be calculated. If the editing distance is less than a predetermined threshold, the character stings may be regarded as match.

An operation performed in a case in which the answer to the query expression and the correct answer match, that is, in a case in which a positive example is obtained has been described above. On the other hand, in a case in which the answer to the query expression and the correct answer do not match, that is, in a case in which a negative example is obtained, the weight is not increased but decreased.

As described above, the information processing apparatus 210 according to this example embodiment generates a query expression in consideration of the positive example condition and the weight of the parameters every time a pair of a question and a correct answer is given, and updates the parameters 250 in the parameter storage unit 240 based on the answer from the search system 220.

(End of Parameter Updating: S611)

The machine learning of the converter by parameter updating of the information processing apparatus 210 is ended when the updating count has reached a predetermined count. Alternatively, the machine learning may be ended when the probability (correct answer ratio) that the answer to the inquiry by the query expression generated based on the question matches the correct answer exceeds a threshold. Otherwise, the machine learning may be ended when the probability (failure ratio) that the answer to the inquiry by the query expression generated based on the question does not match the correct answer falls below a threshold.

<<Hardware Arrangement of Information Processing Apparatus>>

Figure 15:
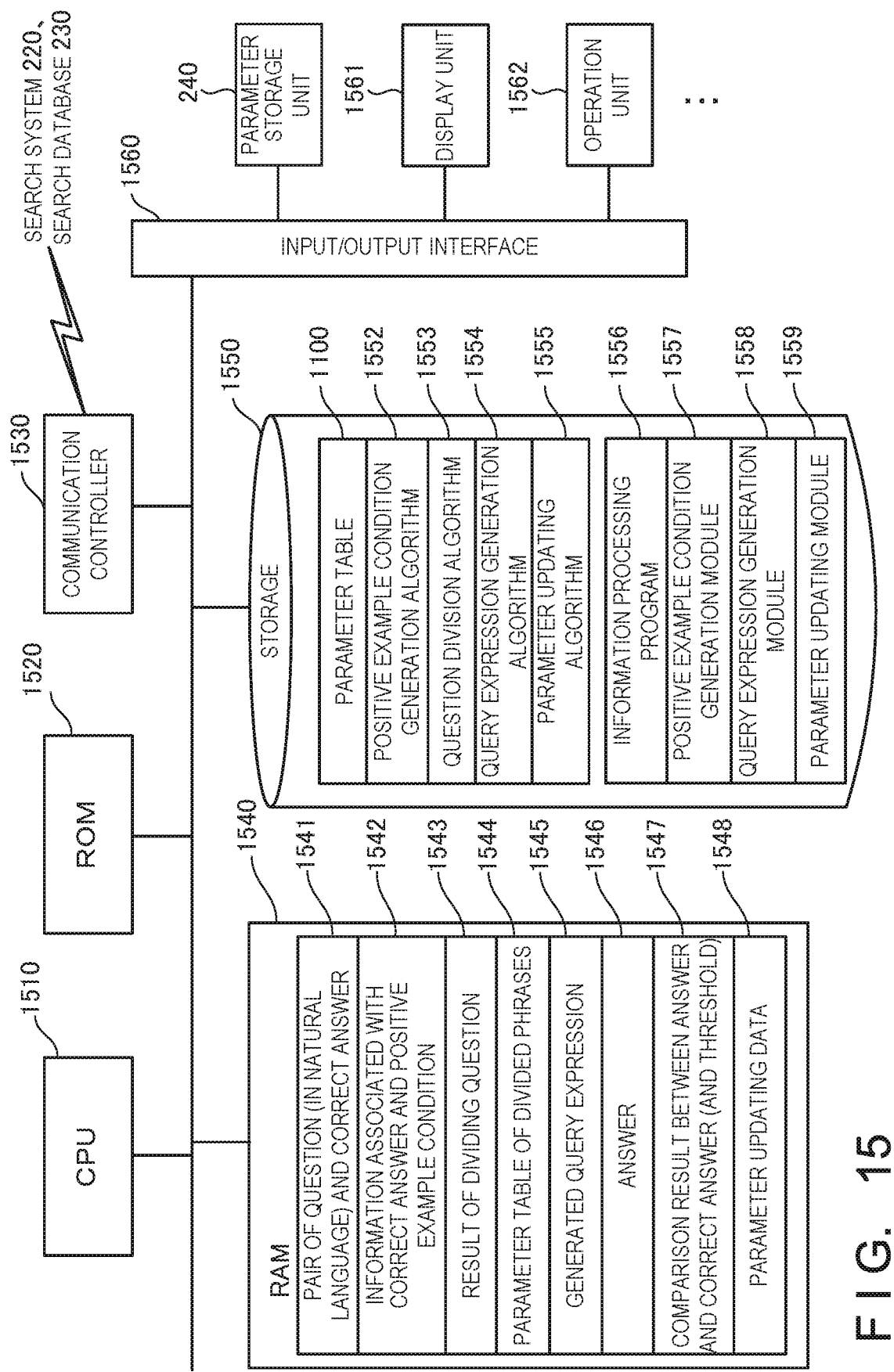
FIG. 15 is a block diagram showing the hardware arrangement of the information processing apparatus according to the second example embodiment of the present invention.

FIG. 15 is a block diagram showing the hardware arrangement of the information processing apparatus 210 according to this example embodiment.

In FIG. 15, a CPU 1510 is a processor for arithmetic control and executes a program, thereby implementing the functional components shown in FIG. 3A. The CPU 1510 may include a plurality of processors and execute different programs, modules, tasks, threads, and the like in parallel. A ROM 1520 stores initial data, the permanent data of programs, and the programs. A network interface 1530 controls communication of the information processing apparatus 210 with the search system 220 or the search database 230 via the network.

A RAM 1540 is a random access memory used by the CPU 1510 as a work area for temporary storage. In the RAM 1540, an area to store data necessary for implementation of this example embodiment is allocated. A pair of a question (in natural language) and a correct answer 1541 is input data accepted by the information processing apparatus 210. An information associated with correct answer and positive example condition 1542 is the data of information acquired from the search database 230 in association with the correct answer and a positive example condition generated based on the acquired information in accordance with a positive example condition generation algorithm. A result of question division 1543 is the data of a result of dividing a question into a plurality of phrases in accordance with a question division algorithm 1553. A parameter table of divided phrases 1544 is a table used to process the parameters of a formal language group acquired from the parameter storage unit 240 in correspondence with the divided phrases. A generated query expression 1545 is the data of a query expression generated in accordance with a query expression generation algorithm 1554 by referring to the divided phrase parameter table 1544. An answer 1546 is the data of an answer to an inquiry to the search system 220 by the generated query expression 1545. A comparison result between the answer and the correct answer (and threshold) 1547 is the result of comparison between the answer 1546 and the correct answer of the pair 1541 of the question (natural language) and the correct answer. The threshold is a value used to determine that the answer and the correct answer match. Parameter updating data 1548 is data used to update the parameters 250 in the parameter storage unit 240 in accordance with a parameter updating algorithm 1555 in a case in which the comparison result (threshold) 1547 between the answer and the correct answer indicates matching.

A storage 1550 stores databases, various kinds of parameters, and following data and programs necessary for implementation of this example embodiment. The parameter table 1100 is a table shown in FIG. 11, which is used for priority or probability when generating a query expression. A positive example condition generation algorithm 1552 is an algorithm configured to generate a positive example condition from an input correct answer. The question division algorithm 1553 is an algorithm configured to divide a question into a plurality of phrases. The query expression generation algorithm 1554 is an algorithm configured to generate a query expression with priority given to a positive example from a question, a correct answer, a positive example condition, and parameters in consideration of the priority and probability. The parameter updating algorithm 1555 is an algorithm configured to update the parameters in the parameter storage unit 240 based on the result of comparison between the correct answer and the answer to the inquiry to the search system 220 by the generated query expression.

The storage 1550 stores the following programs. An information processing program 1556 is a program configured to control the entire information processing apparatus 210. A positive example condition generation module 1557 is a module configured to generate a positive example condition from a correct answer in accordance with the positive example condition generation algorithm 1552. A query expression generation module 1558 is a module configured to generate a query expression with priority given to a positive example in accordance with the query expression generation algorithm 1554. A parameter updating module 1559 is a module configured to update the parameters in the parameter storage unit 240 in accordance with the parameter updating algorithm 1555.

An input/output interface 1560 is connected to the parameter storage unit 240, a display unit 1561, an operation unit 1562, and the like and performs interface for them.

Note that programs and data concerning general-purpose functions or other implementable functions of the information processing apparatus 210 are not illustrated in the RAM 1540 and the storage 1550 shown in FIG. 15.

<<Processing Procedure of Information Processing Apparatus>>

Figure 16:
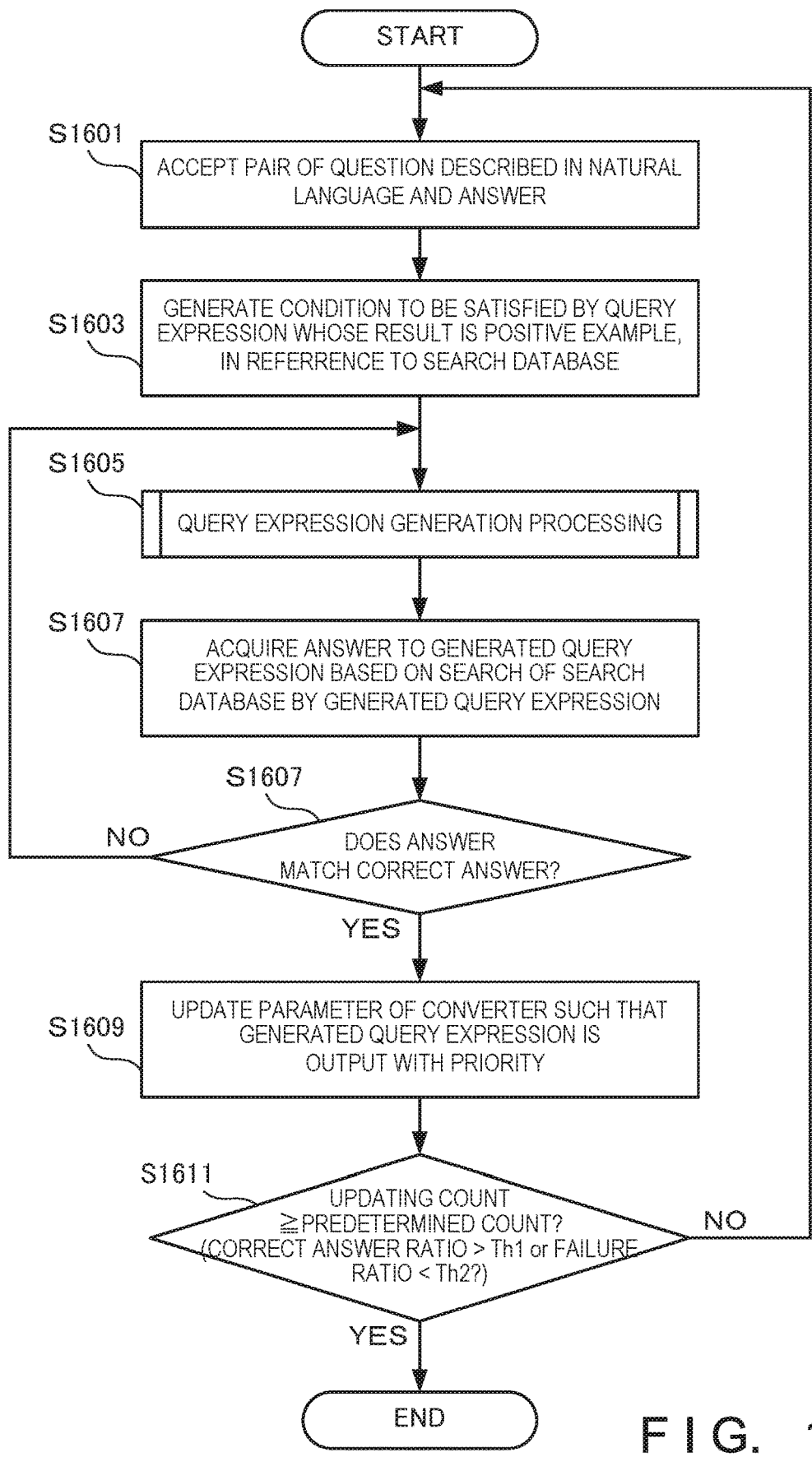
FIG. 16 is a flowchart showing the processing procedure of the information processing apparatus according to the second example embodiment of the present invention.

FIG. 16 is a flowchart showing the processing procedure of the information processing apparatus 210 according to this example embodiment. This flowchart is executed by the CPU 1510 shown in FIG. 15 using the RAM 1540 and implements the functional components shown in FIG. 2.

In step S1601, the information processing apparatus 210 accepts a pair of a question described in the natural language and a correct answer. In step S1603, the information processing apparatus 210 refers to the search database 230 based on the correct answer, thereby generating at least one condition to be satisfied by a query expression whose result is a positive example. In step S1605, the information processing apparatus 210 executes query expression generation processing of generating a query expression corresponding to the question such that a query expression that satisfies the generated condition is given priority. In step S1607, the information processing apparatus 210 acquires an answer to the generated query expression based on the search of the search database 230 by the search system 220 using the generated query expression.

In step S1607, the information processing apparatus 210 determines whether the answer acquired from the search system 220 matches the correct answer. If the answer does not match the correct answer, the information processing apparatus 210 returns to step S1605 to generate the next query expression that satisfies the generated condition. If the answer matches the correct answer, in step S1609, the information processing apparatus 210 updates the parameters 250 of the converter stored in the parameter storage unit 240 such that the generated query expression is output with priority.

In step S1611, the information processing apparatus 210 determines whether the parameter updating count has reached a predetermined count, whether the correct answer ratio that the answer matches the correct answer exceeds a threshold, or whether the failure ratio that the answer does not match the correct answer falls below a threshold. If each branch condition is not satisfied, the information processing apparatus 210 returns to step S1601 to accept the next pair of a question and a correct answer described in the natural language. If each branch condition is satisfied, the information processing apparatus 210 determines that a query expression for which the parameters 250 in the parameter storage unit 240 sufficiently become a positive example can be generated, and ends the processing.

(Query Generation Processing)

Figure 17:
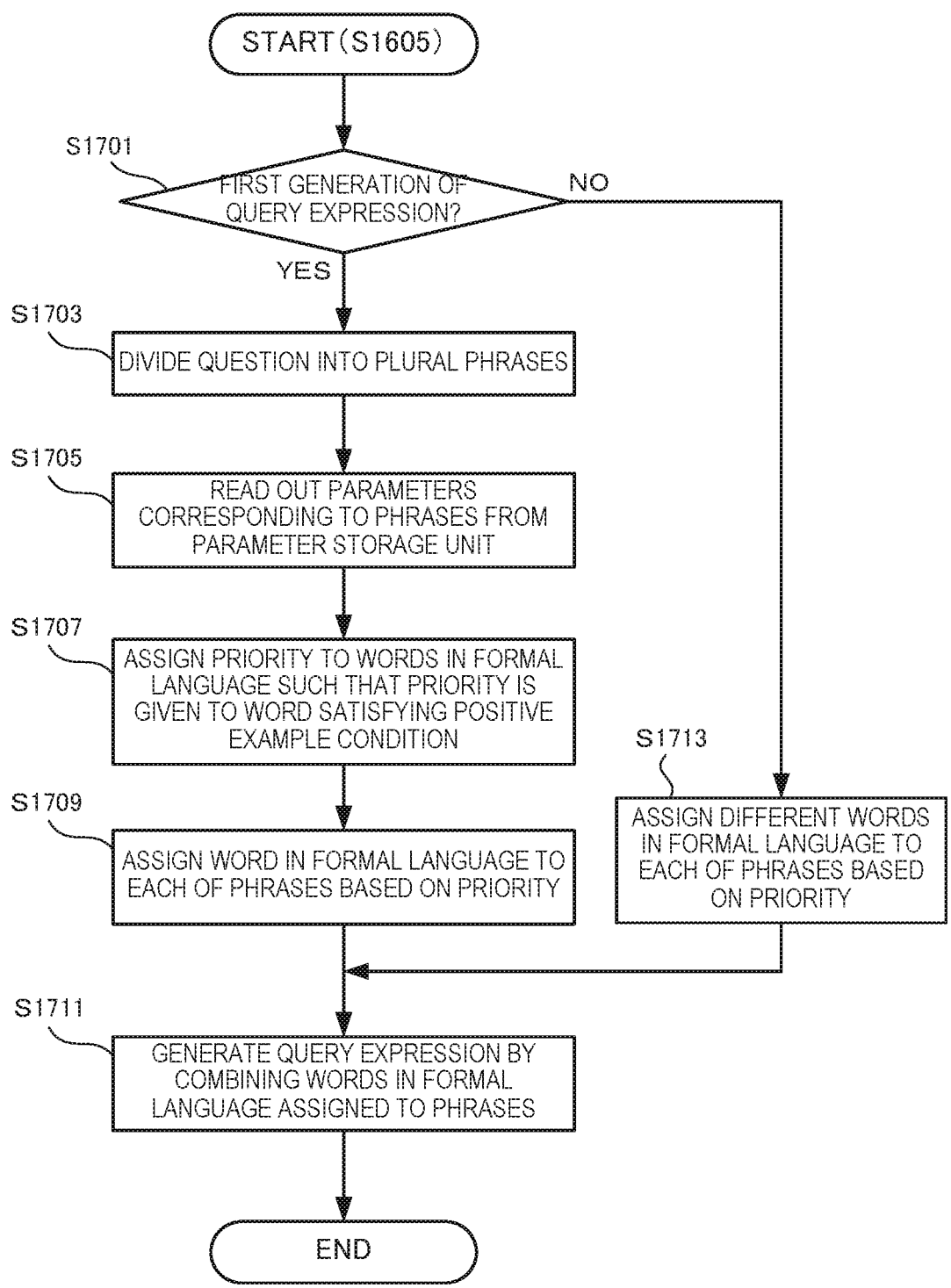
FIG. 17 is a flowchart showing the procedure of query generation processing according to the second example embodiment of the present invention.

FIG. 17 is a flowchart showing the procedure of query generation processing (S1605) according to this example embodiment.

In step S1701, the information processing apparatus 210 determines whether the query expression generation is the first query expression generation. If the query expression generation is the first query expression generation, in step S1703, the information processing apparatus 210 divides a question into a plurality of phrases in accordance with the question division algorithm 1553. In step S1705, the information processing apparatus 210 reads out parameters corresponding to the divided phrases from the parameter storage unit 240. In step S1707, the information processing apparatus 210 assigns priority to each of words in the formal language such that a word satisfying the positive example condition is given priority. In step S1709, the information processing apparatus 210 assigns words in the formal language to the phrases based on the priority. In step 1711, the information processing apparatus 210 generates a query expression by combining the words in the formal language assigned to the phrases.

On the other hand, if the query expression generation is not the first query expression generation, in step S1713, the information processing apparatus 210 assigns different words in the formal language to the each of phrases based on the priority. The information processing apparatus 210 advances to step S1711 to generate a query expression by combining the different words in the formal language assigned to the phrases.

According to this example embodiment, at least one condition to be satisfied by the formal language to obtain the correct answer is generated based on the data associated with the formal language stored in the search database. The query expression is generated to satisfy any of the at least one condition, and updating of the parameters of the converter is efficiently repeated. This makes it possible to efficiently perform machine learning of the converter even in a case in which the number of outputtable expressions in the formal language is large.

Normally, if the number of outputtable expressions in the formal language is large, it is difficult to find a positive example. In this example embodiment, however, since a positive example condition is acquired, and a query expression that satisfies the positive example condition is generated with priority, a positive example that is normally difficult to find can easily be found, and machine learning can efficiently be progressed.

In this example embodiment, the positive example condition is used, thereby obtaining the effect of making the learning efficiently progress at the initial stage of machine learning at which the parameters are not sufficiently updated. When the parameter updating is repeated for various pairs of questions and correct answers, the parameters are sufficiently updated, and a correct query expression is selected without using the positive example condition as a clue.

When the converter is used in practice, and a question whose correct answer is unknown is given, a positive example condition cannot be obtained because the correct answer is unknown. However, when the parameters sufficiently updated by the information processing apparatus 210 according to this example embodiment are used, the converter can select a correct query expression without using the positive example condition as a clue.

Third Example Embodiment

An information processing apparatus according to the third example embodiment of the present invention will be described next. The information processing apparatus according to this example embodiment is different from the above-described second example embodiment in that elements that constitute the information processing system shown FIG. 2 are included in the information processing apparatus. The rest of the components and operations is the same as in the second example embodiment. Hence, the same reference numerals denote the same components and operations, and a detailed description thereof will be omitted.

<<Functional Arrangement of Information Processing Apparatus>>

Figure 18:
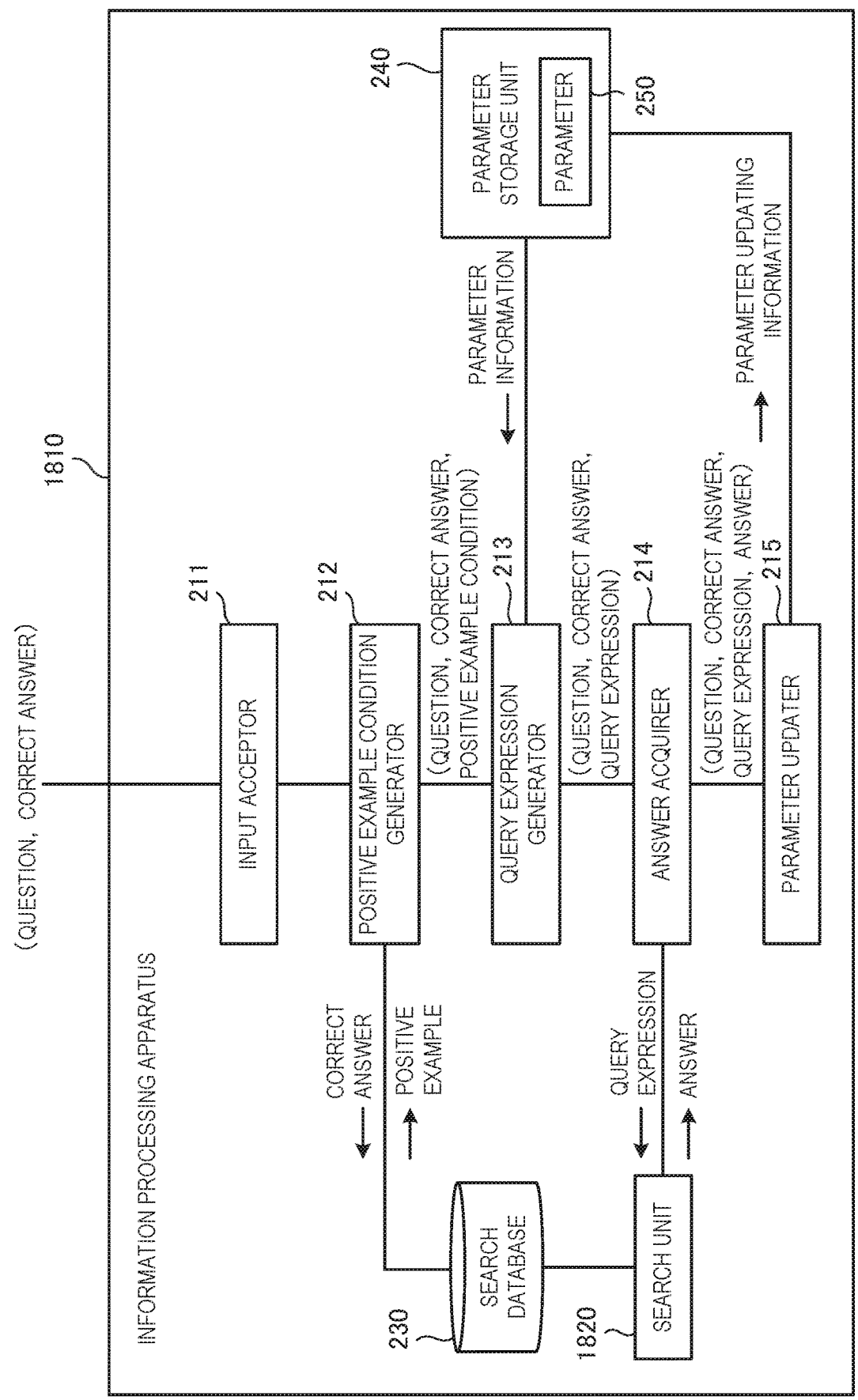
FIG. 18 is a block diagram showing the functional arrangement of an information processing apparatus according to the third example embodiment of the present invention.

FIG. 18 is a block diagram showing the functional arrangement of an information processing apparatus 1810 according to this example embodiment. Note that the same reference numerals as in FIG. 2 denote the same functional components in FIG. 18, and a repetitive description thereof will be omitted.

Referring to FIG. 18, a search unit 1820 is a component formed by including a search system 220 in the information processing apparatus 1810, and is the same as the search system 220.

Other Example Embodiments

Note that the present invention is also useful in various fields in which it is necessary to make an inquiry to a system in a natural language because machine learning of the converter that converts a natural language into a formal language can efficiently be performed even in a case in which the number of outputtable expressions in the formal language is large.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. An information processing apparatus for learning parameters of a converter that converts a question in a natural language into a query expression in a formal language, comprising:
a memory storing instructions; and
a processor configured to execute the instructions to:
accept an input of a set of a question in the natural language and a correct answer that is an appropriate output to the question;
generate at least one condition to be satisfied by the formal language input on searching a search database for the correct answer, based on data associated with the formal language stored in the search database;
generate a query expression in the formal language corresponding to the question using parameters of the converter to satisfy any of the at least one condition;
acquire an answer to the question based on a search of the search database using the generated query expression; and
update the parameters of the converter such that the question is converted with priority into the generated query expression when the answer and the correct answer match,
wherein the processor is further configured to execute the instructions to repeat processes of accepting the input of the set of the question and the correct answer, generating the at least one condition, generating the query expression, acquiring the answer and updating the parameters, until a probability with which the answer and the correct answer match exceeds a second threshold or until a count of updating the parameters by the parameter updater reaches a third threshold.

2. The information processing apparatus according to claim 1, wherein the processor is configured to execute the instructions to generate the query expression by dividing the question into at least two word strings, and assigning the formal language to each of the word strings using the parameters of the converter so as to satisfy any of the at least one condition.

3. The information processing apparatus according to claim 2, wherein the processor is configured to execute the instruction to:
generate the query expression by evaluating an importance of the at least one condition used to output the correct answer and giving priority to the formal language included in a high important condition over the formal language included in a low important condition, and
acquire a plurality of answers to the question using the plurality of query expressions in the formal language.

4. The information processing apparatus according to claim 3, wherein the processor is configured to execute the instructions to generate at least one condition including at least one of a first formal language and a second formal language by acquiring, from the search database, the first formal language necessary to search for the correct answer, and acquiring, from the search database, the second formal language necessary to search for the first formal language.

5. The information processing apparatus according to claim 4, wherein the processor is configured to execute the instructions to update the parameter by calculating an error between the answer and the correct answer, and determining that the answer and the correct answer match when the error is smaller than a first threshold.

6. The information processing apparatus according to claim 3, wherein the processor is configured to execute the instructions to update the parameter by calculating an error between the answer and the correct answer, and determining that the answer and the correct answer match when the error is smaller than a first threshold.

7. The information processing apparatus according to claim 2, wherein the processor is configured to execute the instructions to generate at least one condition including at least one of a first formal language and a second formal language by acquiring, from the search database, the first formal language necessary to search for the correct answer, and acquiring, from the search database, the second formal language necessary to search for the first formal language.

8. The information processing apparatus according to claim 7, wherein the processor is configured to execute the instructions to update the parameter by calculating an error between the answer and the correct answer, and determining that the answer and the correct answer match when the error is smaller than a first threshold.

9. The information processing apparatus according to claim 2, wherein the processor is configured to execute the instructions to update the parameter by calculating an error between the answer and the correct answer, and determining that the answer and the correct answer match when the error is smaller than a first threshold.

10. The information processing apparatus according to claim 1, wherein the processor is configured to execute the instruction to:
    generate the query expression by evaluating an importance of the at least one condition used to output the correct answer and giving priority to the formal language included in a high important condition over the formal language included in a low important condition, and
    acquire a plurality of answers to the question using the plurality of query expressions in the formal language.

11. The information processing apparatus according to claim 10, wherein the processor is configured to execute the instructions to generate at least one condition including at least one of a first formal language and a second formal language by acquiring, from the search database, the first formal language necessary to search for the correct answer, and acquiring, from the search database, the second formal language necessary to search for the first formal language.

12. The information processing apparatus according to claim 11, wherein the processor is configured to execute the instructions to update the parameter by calculating an error between the answer and the correct answer, and determining that the answer and the correct answer match when the error is smaller than a first threshold.

13. The information processing apparatus according to claim 10, wherein the processor is configured to execute the instructions to update the parameter by calculating an error between the answer and the correct answer, and determining that the answer and the correct answer match when the error is smaller than a first threshold.

14. The information processing apparatus according to claim 1, wherein the processor is configured to execute the instructions to generate at least one condition including at least one of a first formal language and a second formal language by acquiring, from the search database, the first formal language necessary to search for the correct answer, and acquiring, from the search database, the second formal language necessary to search for the first formal language.

15. The information processing apparatus according to claim 14, wherein the processor is configured to execute the instructions to update the parameter by calculating an error between the answer and the correct answer, and determining that the answer and the correct answer match when the error is smaller than a first threshold.

16. The information processing apparatus according to claim 1, wherein the processor is configured to execute the instructions to update the parameter by calculating an error between the answer and the correct answer, and determining that the answer and the correct answer match when the error is smaller than a first threshold.

17. A non-transitory computer-readable storage medium storing an information processing program for learning parameters of a converter that converts a question in a natural language into a query expression in a formal language, the information processing program causing a computer to execute a method comprising:
    accepting an input of a set of a question in the natural language and a correct answer that is an appropriate output to the question;
    generating at least one condition to be satisfied by the formal language input on searching a search database for the correct answer, based on data associated with the formal language stored in the search database;
    generating a query expression in the formal language corresponding to the question using the parameters of the converter to satisfy any of the at least one condition;
    acquiring an answer to the question based on a search of the search database using the generated query expression;
    updating the parameters of the converter such that the question is converted with priority into the generated query expression when the answer and the correct answer match; and
    repeating processes of accepting the input of the set of the question and the correct answer, generating the at least one condition, generating the query expression, acquiring the answer and updating the parameters, until a probability with which the answer and the correct answer match exceeds a second threshold or until a count of updating the parameters by the parameter updater reaches a third threshold.

18. An information processing system for learning parameters of a converter that converts a question in a natural language into a query expression in a formal language, comprising:
    a search apparatus that searches a search database for an answer using a query expression in the formal language and outputs the answer;
    an information processing apparatus for learning the parameters of the converter; and
    a parameter storage unit that stores the parameters of the converter,
    wherein the information processing apparatus comprises:
    a memory storing instructions; and
    a processor configured to execute the instructions to:

accept an input of a set of a question in the natural language and a correct answer that is an appropriate output to the question;

generate at least one condition to be satisfied by the formal language input on searching the search database for the correct answer, based on data associated with the formal language stored in the search database;

generate a query expression in the formal language corresponding to the question using the parameters of the converter from the parameter storage unit to satisfy any of the at least one condition;

acquire an answer to the question from the search apparatus that has searched the search database using the generated query expression; and update the parameters of the converter stored in the parameter storage unit such that the question is converted with priority into the generated query expression when the answer and the correct answer match, wherein the processor is further configured to execute the instructions to repeat processes of accepting the input of the set of the question and the correct answer, generating the at least one condition, generating the query expression, acquiring the answer and updating the parameters, until a probability with which the answer and the correct answer match exceeds a second threshold or until a count of updating the parameters by the parameter updater reaches a third threshold.

* * * * *